United States Patent
Mears et al.

(10) Patent No.: US 8,539,519 B2
(45) Date of Patent: *Sep. 17, 2013

(54) METHODS AND APPARATUS TO ADAPTIVELY SELECT SENSOR(S) TO GATHER AUDIENCE MEASUREMENT DATA BASED ON A VARIABLE SYSTEM FACTOR AND A QUANTITY OF DATA COLLECTABLE BY THE SENSORS

(75) Inventors: Paul M. Mears, Safety Harbor, FL (US); Arun Ramaswamy, Tampa, FL (US)

(73) Assignee: The Nielsen Company (US), LLC., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/194,657

(22) Filed: Jul. 29, 2011

(65) Prior Publication Data

US 2011/0289523 A1 Nov. 24, 2011

Related U.S. Application Data

(63) Continuation of application No. 12/847,805, filed on Jul. 30, 2010, now Pat. No. 8,020,179, which is a continuation of application No. 10/867,190, filed on Jun. 14, 2004, now Pat. No. 7,793,316, which is a continuation of application No. PCT/US03/04030, filed on Feb. 10, 2003.

(51) Int. Cl.
*H04N 7/16* (2011.01)
*H04N 17/00* (2006.01)
*G06Q 30/00* (2012.01)
*G06F 15/173* (2006.01)

(52) U.S. Cl.
USPC ............. 725/9; 348/180; 705/14.44; 709/224

(58) Field of Classification Search
USPC .......... 725/9; 348/180; 705/14.44; 709/224
See application file for complete search history.

(56) References Cited

U.S. PATENT DOCUMENTS

| | | | |
|---|---|---|---|
| 4,245,245 A | 1/1981 | Matsumoto et al. |
| 4,408,345 A | 10/1983 | Yashiro et al. |
| 4,461,241 A | 7/1984 | Ostler |
| 4,567,511 A | 1/1986 | Smith et al. |
| 4,943,963 A | 7/1990 | Waechter et al. |
| 5,410,344 A | 4/1995 | Graves et al. |
| 5,481,294 A | 1/1996 | Thomas et al. |

(Continued)

FOREIGN PATENT DOCUMENTS

WO 9512278 5/1995

OTHER PUBLICATIONS

United States Patent and Trademark Office, "Final Office action", issued in connection with U.S. Appl. No. 10/867,190, Nov. 4, 2008, (17 pages).

(Continued)

*Primary Examiner* — Hoang-Vu A Nguyen-Ba
(74) *Attorney, Agent, or Firm* — Hanley, Flight and Zimmerman, LLC.

(57) ABSTRACT

Methods and apparatus to adaptively gather audience information data are disclosed. The disclosed methods and apparatus monitor system factor(s) and select one or more sensors from a plurality of sensors positioned to gather audience measurement data based on the monitored factor(s). Thus, the disclosed methods and apparatus adapt to the conditions they face by selecting an amount and/or type of audience measurement data they gather.

24 Claims, 19 Drawing Sheets

(56) References Cited

U.S. PATENT DOCUMENTS

| | | | |
|---|---|---|---|
| 5,483,276 A * | 1/1996 | Brooks et al. | 725/10 |
| 5,550,928 A | 8/1996 | Lu et al. | |
| 5,640,192 A | 6/1997 | Garfinkle | |
| 5,715,325 A | 2/1998 | Bang et al. | |
| 5,754,939 A | 5/1998 | Herz et al. | |
| 5,828,402 A | 10/1998 | Collings | |
| 5,867,205 A | 2/1999 | Harrison | |
| 5,872,588 A | 2/1999 | Aras et al. | |
| 5,889,548 A | 3/1999 | Chan | |
| 5,920,641 A | 7/1999 | Ueberreiter et al. | |
| 5,973,683 A | 10/1999 | Cragun et al. | |
| 6,052,734 A | 4/2000 | Ito et al. | |
| 6,184,918 B1 | 2/2001 | Goldschmidt Iki et al. | |
| 6,359,557 B2 | 3/2002 | Bilder | |
| 6,487,719 B1 | 11/2002 | Itoh et al. | |
| 6,523,175 B1 | 2/2003 | Chan | |
| 6,606,744 B1 | 8/2003 | Mikurak | |
| 6,671,818 B1 | 12/2003 | Mikurak | |
| 7,124,101 B1 | 10/2006 | Mikurak | |
| 7,130,807 B1 | 10/2006 | Mikurak | |
| 7,793,316 B2 | 9/2010 | Mears | |
| 8,020,179 B2 | 9/2011 | Mears | |
| 8,125,455 B2 * | 2/2012 | Land et al. | 345/173 |
| 8,296,087 B2 * | 10/2012 | Kalinin et al. | 702/76 |
| 2002/0144259 A1 | 10/2002 | Gutta et al. | |
| 2002/0152090 A1 | 10/2002 | Kobayashi et al. | |
| 2002/0174425 A1 | 11/2002 | Markel et al. | |
| 2003/0121041 A1 | 6/2003 | Mineyama | |
| 2003/0172376 A1 | 9/2003 | Coffin, III | |
| 2004/0041703 A1 * | 3/2004 | Bergman et al. | 340/514 |
| 2004/0064351 A1 | 4/2004 | Mikurak | |
| 2005/0054285 A1 | 3/2005 | Mears et al. | |
| 2006/0178918 A1 | 8/2006 | Mikurak | |
| 2010/0299689 A1 | 11/2010 | Mears et al. | |

OTHER PUBLICATIONS

United States Patent and Trademark Office, "Office action", issued in connection with U.S. Appl. No. 10/867,190, May 8, 2008, (22 pages).

United States Patent and Trademark Office, "Office action", issued in connection with U.S. Appl. No. 10/867,190, Feb. 22, 2010, (19 pages).

Communication regarding supplemental European Search Report corresponding to European Patent Application No. EP 03 81 5891, mailed Feb. 27, 2009, 1 page.

Supplementary European Search Report corresponding to European Patent Application No. EP 03 81 5891, completed Feb. 11, 2009, 1 page.

Annex to the European Search Report corresponding to European Patent Application No. EP 03 81 5891, Feb. 11, 2009, 1 page.

Communication indicating grant of Indian Patent No. 225893, mailed Jan. 27, 2009, 3 pages.

Communication regarding first examination report in connection with Indian Patent Application No. 1833/CHENP/2005 (now Indian Patent No. 225893), mailed Feb. 27, 2007, 1 page.

English translation of first examination report in connection with Indian Patent Application No. 1833/CHENP/2005 (now Indian Patent No. 225893), mailed Feb. 27, 2007, 2 pages.

Communication regarding Office action issued in connection with Indian Patent Application No. 1833/CHENP/2005 (now Indian Patent No. 225893), mailed Dec. 12, 2007, 1 page.

English translation of Office action in connection with Indian Patent Application No. 1833/CHENP/2005 (now Indian Patent No. 225893), mailed Dec. 12, 2007, 1 page.

Communication regarding examiner interview in connection with Taiwanese Patent Application No. 92107979, mailed Oct. 31, 2007, 1 page.

Translation of examiners opinion in connection with Taiwanese Patent Application No. 92107979, Oct. 30, 2007, 1 page.

International Preliminary Examining Authority, "Written Opinion," issued in connection with international application No. PCT/US03/04030, mailed Dec. 12, 2003, 8 pages.

International Preliminary Examining Authority, "International Preliminary Examination Report," issued in connection with international application No. PCT/US03/04030, date of completion Mar. 23, 2004, 9 pages.

International Searching Authority, "International Search Report," issued in connection with international application No. PCT/US03/04030, mailed Aug. 19, 2003, 4 pages.

United States Patent and Trademark Office, "Notice of Allowance" issued in connection with U.S. Appl. No. 10/867,190, mailed Jul. 21, 2010, 11 pages.

United States Patent and Trademark Office, "Advisory Action" issued in connection with U.S. Appl. No. 10/867,190, mailed Feb. 24, 2009, 3 pages.

United States Patent and Trademark Office, "Non-final Office Action" issued in connection with U.S. Appl. No. 10/867,190, mailed Jul. 28, 2009, 18 pages.

* cited by examiner

| RULE # 1 |
|---|
| 1. AUDIO CODES |
| 2. VIDEO CODES |
| 3. AUDIO SIGNATURES |
| 4. VIDEO SIGNATURES |
| 5. SOFTWARE METER |

FIG. 4A

| RULE # 2 |
|---|
| 1. AUDIO SIGNATURES |
| 2. VIDEO SIGNATURES |
| 3. AUDIO CODES |
| 4. VIDEO CODES |

FIG. 4B

| RULE # 3 |
|---|
| 1. SOFTWARE METER |
| 2. AUDIO CODES |
| 3. AUDIO SIGNATURES |
| 4. VIDEO CODES |
| 5. VIDEO SIGNATURES |

FIG. 4C

| VALID SENSOR LIST |
| --- |
| 1. AUDIO CODE SENSOR |
| 2. VIDEO CODE SENSOR |
| 3. AUDIO SIGNATURE SENSOR |
| 4. VIDEO SIGNATURE SENSOR |
| 5. SOFTWARE METER |

FIG. 7A

| VALID SENSOR LIST |
| --- |
| 1. AUDIO CODE SENSOR |
| 2. VIDEO CODE SENSOR |
| 3. AUDIO SIGNATURE SENSOR |
| 4. VIDEO SIGNATURE SENSOR |

FIG. 7B

| VALID SENSOR LIST |
| --- |
| 1. AUDIO CODE SENSOR |
| 2. VIDEO CODE SENSOR |
| 3. AUDIO SIGNATURE SENSOR |

FIG. 7C

| VALID SENSOR LIST |
| --- |
| 1. AUDIO CODE SENSOR |
| 2. VIDEO CODE SENSOR |

FIG. 7D

METHODS AND APPARATUS TO ADAPTIVELY SELECT SENSOR(S) TO GATHER AUDIENCE MEASUREMENT DATA BASED ON A VARIABLE SYSTEM FACTOR AND A QUANTITY OF DATA COLLECTABLE BY THE SENSORS

CROSS-REFERENCE TO RELATED APPLICATION

This application claims priority as a continuation of pending patent application Ser. No. 12/847,805, filed on Jul. 30, 2010, which claims priority as a continuation application from U.S. patent application Ser. No. 10/867,190, filed on Jun. 14, 2004, now U.S. Pat. No. 7,793,316, granted on Sep. 7, 2010, which claims priority as a continuation application from International Patent Application Serial Number PCT/US03/04030, which was filed on Feb. 10, 2003, each of which is herein incorporated by reference in its entirety.

FIELD OF THE DISCLOSURE

This disclosure relates generally to audience measurement, and, more particularly, to methods and apparatus to adaptively gather audience information data.

BACKGROUND

Audience measurement of broadcasted television and/or radio programs has been practiced for many years. Audience measurement devices typically collect two kinds of information from statistically selected homes spread across a geographic area of interest. Specifically, audience measurement devices typically collect tuning information (e.g., information indicating the content presented to the audience such as channel information, time of consumption information, program information, etc.) and people information (e.g., information about the demographics of the audience). These two types of information are gathered, recorded and combined to produce meaningful ratings data.

Typically, each monitored household is provided with a home unit such as the example home unit 10 shown in FIG. 1. The home unit 10 includes a plurality of sensors to gather tuning information. The sensors may be hardware or software based. Frequently, each sensor is designed to gather a specific type of data that may be used to identify the program being consumed at a given time. For example, a home unit 10 may include an audio code sensor 12 that monitors the audio signal of a program being consumed to detect in-band audio codes which identify the date and time of broadcast, and the channel carrying or station broadcasting the program with which the codes are associated. These codes are typically watermarks hidden in the signal by a Psycho-Acoustic Masking algorithm. Although imperceptible to the human ear, these watermarks can be picked up by an audio sensor.

The home unit 10 may also or alternatively include a video code sensor 14 to detect video codes broadcast, for example, in a vertical blanking interval of the video component of a program being consumed. Like audio codes, video codes can be any type of signal (digital, analog), or absence of a signal that may be used to identify a program being consumed, a tuned channel, and/or a broadcasting station. For example, a given television station may always place a flash of light in the upper right corner of the screen during the vertical blanking intervals of every program it broadcasts. If this code is unique to that station (e.g., ABC™) in the relevant geographic market, when the video code sensor 14 detects a flash in the upper right hand corner of a frame, the home unit 10 or central office knows that the program being viewed has been broadcast by that station (e.g., ABC™). With this information, the time of the broadcast, and a program guide, the identity of the program being viewed can be precisely obtained. Of course, other codes may alternatively be used such as markers, alphanumeric codes, tone codes, positional codes, intensity codes, data inserted into a compressed digital bitstream, data inserted into the audio, video, or ancillary data fields, the act of turning the luminance level of a pixel brighter or darker, etc.

By way of another example, the video code sensor 14 may be an Automatic Measurement Of Line-up (AMOL) decoder. An AMOL decoder reads codes embedded in a broadcast video signal outside the active video area (i.e., outside the portion of the signal that is displayed on a television receiving the signal). As is well known, the active video area starts in the $22^{nd}$ line of a broadcast frame. AMOL codes are placed in the signal in lines before the active video area (e.g., in lines 19, 20 and 21). The AMOL codes identify the channel broadcasting the program containing the codes. Because the codes are embedded outside of the active video area that appears on the television, they are not visible to viewers. However, the AMOL decoder can be used to extract the codes from the received signal to identify the program being viewed.

In still another example, the video code sensor 14 may be implemented by a video watermarking sensor. Video watermarking is like audio watermarking in that a watermark is encoded into the active video area of a broadcasted signal in such a way that it can be perceived by the video watermarking sensor, but cannot be perceived by the viewers of the program.

In yet another example, the video code sensor 14 may be implemented by an on-screen display sensor. An on-screen display sensor is structured to monitor for channel numbers displayed on the television or other viewing screen. The on-screen display sensor detects such numbers, digitizes them and uses the digitized image to identify the channel number of the channel currently being viewed.

Alternatively or additionally, the home unit 10 may also be provided with an audio signature sensor 16 and/or a video signature sensor 18. An audio signature sensor 16 records one or more segments of an audio signal output in the home for comparison against a library of audio segments to determine the identity of the associated program. Similarly, a video signature sensor 18 records one or more video frames or segments of the program being viewed for comparison (either locally or remotely) against a library of video signals. A match between the recorded signature and a signature in a library gives a high degree of confidence that the program has been correctly identified. When this identity is combined with a time of broadcast and a geographical location, the station broadcasting the program can be identified.

Alternatively or additionally, the home unit 10 may be provided with a software meter 20. A software meter 20 may monitor signals decoded by a set top box, a Digital Video Recorder, an in-home Media Server, and/or other computing device as a vehicle for identifying the programs being viewed and the stations that broadcasted the same. Typically, the software meter 20 accesses an interactive program guide or other matrix identifying program carried by the datastream processed by the set top box to identify the tuned program/broadcasting station. For example, the software meter may be implemented by a digital bitstream decoder which extracts embedded codes from a digital bitstream. For example, the digital bitstream decoder may extract codes from a signal output by a set top box (STB) (e.g., it may extract codes from an audio signal sent from the STB to an AC-3 decoder).

Software meters 20 may also be used to monitor Internet traffic. For example, a software meter 20 may track and record the universal resource locators (URLs) input to a browser running on a computer or Internet appliance in order to develop ratings information concerning Internet website visitations.

A home unit 10 typically includes five or more of the above or other types of sensors 12, 14, 16, 18, 20. These sensors 12, 14, 16, 18, 20 are sometimes referred to as "data collection engines." Like airplane engines, multiple data collection engines 12, 14, 16, 18, 20 are available so that, if one or more of these engines should fail, the remaining engines 12, 14, 16, 18, and/or 20 are still available to collect useful data.

The data gathered by the data collection engines 12, 14, 16, 18, 20 is input to a switch 22, which may be implemented by a programmed processor. The switch 22 determines which sensors or collection engines 12, 14, 16, 18, 20 are providing valid data. Because resources are limited, the switch 22 is programmed to use the data from some of the sensors 12, 14, 16, 18, 20, and ignore the data from the remaining sensors 12, 14, 16, 18, 20. In particular, the switch 22 is provided with a static set of rules which dictates the priorities to be assigned to the sensors 12, 14, 16, 18, 20. For example, the switch 22 is typically structured to prefer audio codes to audio signatures, audio signatures to video codes, video codes to video signatures, etc. Thus, if, for example, audio codes are available and the audio code sensor 12 is working, the switch 22 may process the audio codes and ignore the outputs of the other sensors 14, 16, 18, 20. If audio codes are not available and/or the audio code sensor 12 is not functioning, the switch 22 may process the audio signatures collected by the audio signature sensor 16 while discarding the outputs of the sensors 12, 14, 18 and 20. Alternatively or additionally, when faced with limited bandwidth in the communication channel 26 between the switch 22 and central office 24, the switch 22 may store some of the collected data and output it in a time division multiplexing scheme (e.g., transmit code data, then transmit signature data, then transmit code data, etc.).

The switch 22 of the home unit 10 is typically connected to a central office 24 by a communication link 26 (e.g., the Internet, the plain old telephone system, a wireless connection, etc). The central office 24 receives the data gathered by home units 10 which are scattered across a geographical area of interest and develops meaningful ratings information from the collected data.

BRIEF DESCRIPTION OF THE DRAWINGS

FIGS. 4A-4C illustrate example rules which assign a priority ranking to the sensors of the apparatus of FIG. 2.

FIGS. 7A-7D illustrate an example valid sensor list as it might be modified by the program of FIGS. 5A-5D in response to variable system conditions.

DETAILED DESCRIPTION

Figure 1:
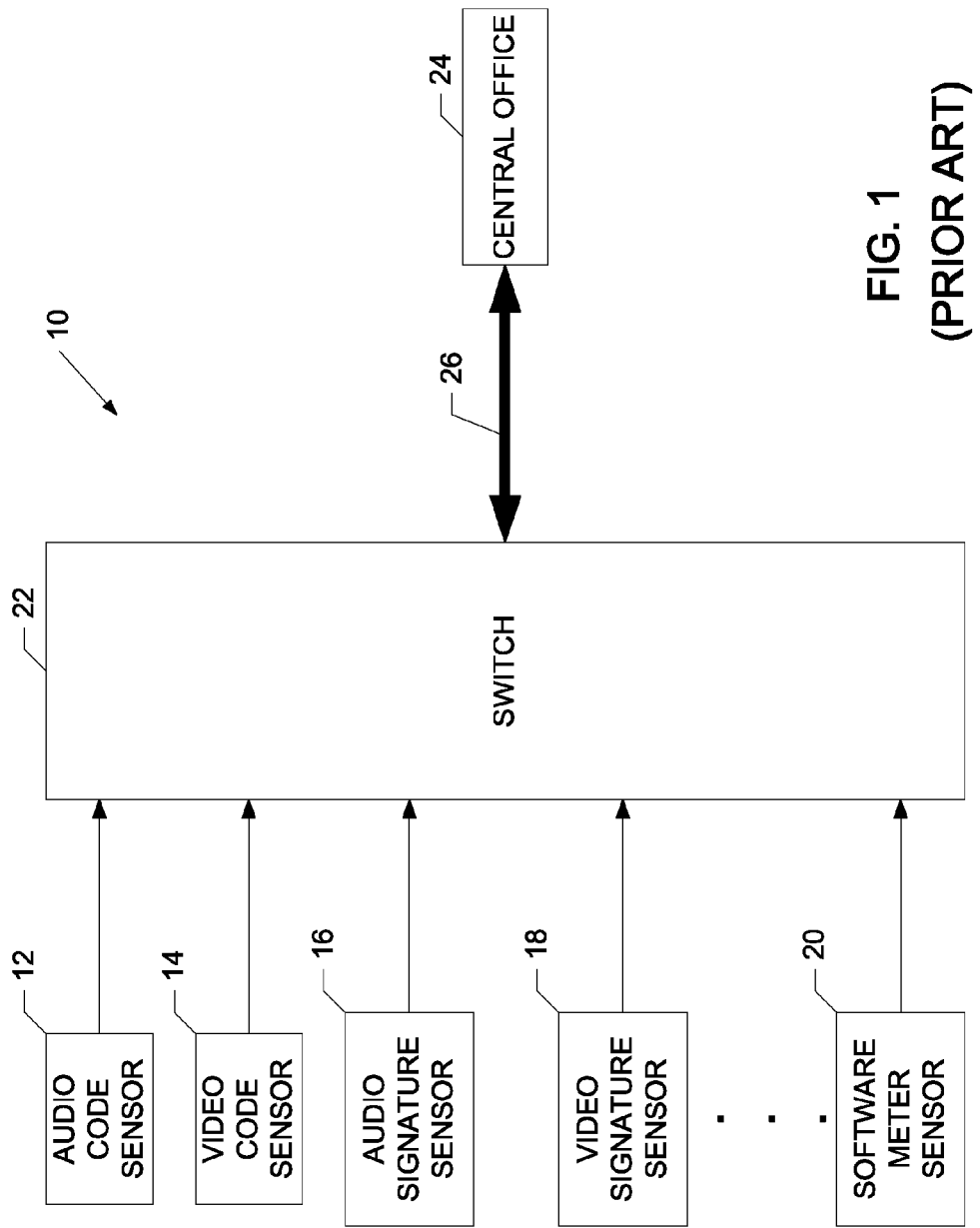
FIG. 1 is a schematic illustration of a prior art apparatus to gather audience measurement data.
Figure 2:
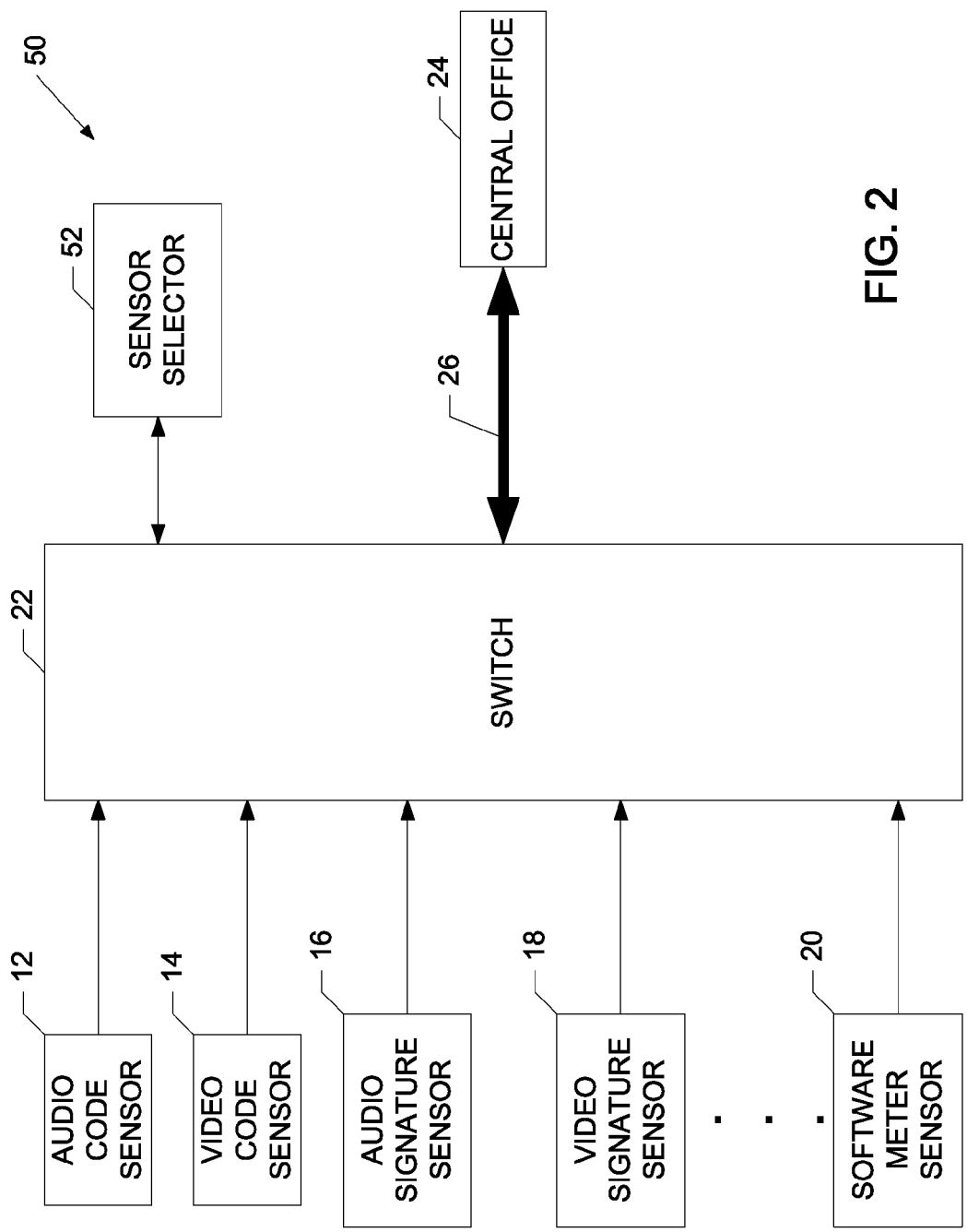
FIG. 2 is a schematic illustration of an example apparatus to adaptively gather audience measurement data.

FIG. 2 is a schematic illustration of an example apparatus 50 which may be employed to adaptively gather audience measurement data such as, for example, tuning information. Like the prior art apparatus 10 of FIG. 1, the example apparatus 50 of FIG. 2 includes a plurality of sensors. The plurality of sensors may include an audio code sensor 12, a video code sensor 14 (e.g., an on-screen display sensor, a video watermarking sensor, an AMOL code sensor, etc.), an audio signature sensor 16 (e.g., an audio watermarking sensor), a video signature sensor 18, a software meter sensor 20 (e.g., a digital bitstream sensor), and/or other sensors to gather tuning and/or audience composition data. As explained in detail below, the illustrated apparatus 50 may process the output(s) of one or more of the sensors 12-20 and/or ignore the output(s) of one or more of the sensor(s) 12-20 based on one or more variable system factors. The identities of the sensor(s) 12-20 being utilized and/or the sensor(s) 12-20 being ignored may vary over time as a function of changes in the monitored system variables as discussed further below.

Like the prior art apparatus 10, the example apparatus 50 of FIG. 2 includes a switch 22. As explained above, the switch 22 selectively couples one or more of the sensors 12-20 to an output such as the communication channel 26. For example, the switch 22 has a plurality of states in which different combinations of the sensors 12-20 are coupled to the output. For instance, in one state, the switch 22 may couple none of the sensors 12-20 to the output 26. In another state, the switch 22 may couple all of the sensors 12-20 to the output 26. In still other states, the switch may couple less than all of the sensors to the output 26, in any combination.

Persons of ordinary skill in the art will readily appreciate that the switch 22 may be implemented in many different ways. For example, the switch 22 may be implemented by a matrix of controlled switches such as transistors, and/or the switch may be implemented by a programmed processor. As a result, persons of ordinary skill in the art will appreciate that, as used herein "connected" and "coupled" are not limited to direct physical connections, but instead encompass direct physical connections, indirect physical connections, and non-physical connections wherein data is simply transferred from one device to the other via some intermediary. Thus, the switch 22 may couple a sensor to the output by processing the data output by the switch 22 and delivering the processed data to the output 26. The data output by a sensor 12-20 that is not "coupled" to the output 26 (e.g., an "ignored," "isolated," or "dropped" sensor) may simply be ignored by the switch 22 such that the ignored data is not delivered to the output 26 and, thus, is typically not processed, or, alternatively, the switch 22 may break a circuit path (by, for example, changing the state of a controlled switch such as a transistor) between the ignored sensor and the output 26.

As in the apparatus 10, the switch 22 of the example apparatus 50 is coupled to a central office 24 via a communication link 26 and/or an intermediate in home collection unit 10. The communication link 26 can be implemented by any known wired or wireless communications technology. For example, the communication link 26 may comprise a point to point satellite system, the Internet, the plain old telephone system, and/or a dedicated network link. In other words, the bandwidth may be limited and/or variable.

To address this bandwidth variability and other variable system factors, the example apparatus 50 is provided with a sensor selector 52. The sensor selector 52 monitors at least one variable system factor and selects which set of the sensors 12-20 (e.g., all of the sensors, any combination of the sensors or none of the sensors) are to be used to collect data based on those factor(s). The sensor selector 52 may also select which set of the sensors 12-20 are used to collect data based on one or more fixed system factors as explained in detail below. Indeed, in the illustrated example, the sensors 12-20 are first ranked in order of preference based, at least in part, on one or more fixed system factors, and then the sensors 12-20 (which may include all or less than all of the sensors 12-20) from which to collect audience measurement data are selected based on one or more variable system factors. If less than all of the sensors 12-20 are selected for data gathering, to the extent possible the sensor(s) 12-20 are used and/or ignored in accordance with the preference ranking indicated by the fixed system factors.

Although illustrated in FIG. 2 as being located at the home site, persons of ordinary skill in the art will readily appreciate that the sensor selector 52 may be located in whole or in part at the home site and/or the central office 24.

Figure 3:
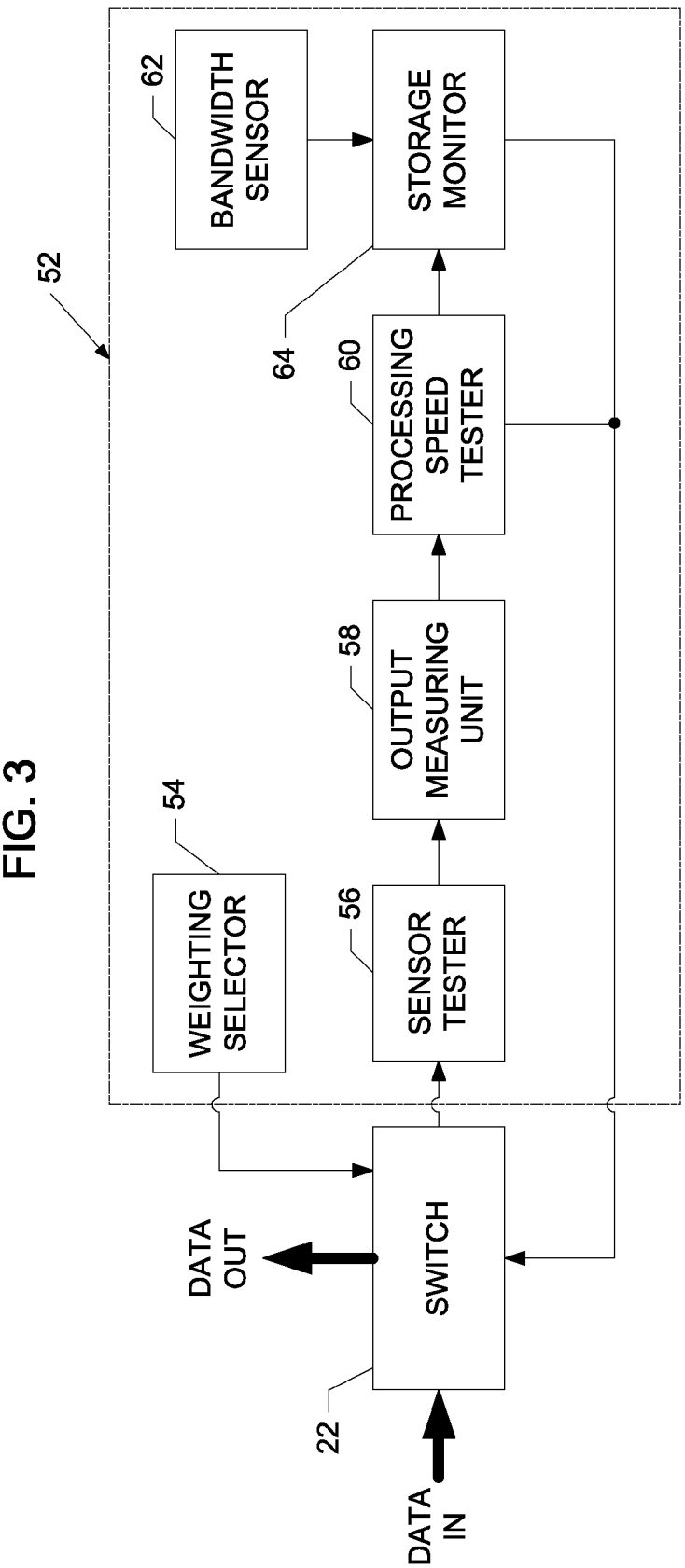
FIG. 3 is a more detailed schematic illustration of the example apparatus of FIG. 2.

A more detailed view of the example apparatus 50 is shown in FIG. 3. For the purpose of adjusting the operation of the apparatus 50 to accommodate the fixed system factors, the sensor selector 52 is provided with a weighting selector 54. The weighting selector 54 determines a ranking, priority, or preference order of the sensors 12-20 based on one or more fixed system factors. Fixed system factors are system factors that are not typically subject to short term variation. Fixed system factors include such things as, for example: (a) a number of affiliates of a particular broadcasting company in a particular market, (b) a local preference for a particular sensor type, (c) a presence of a set top box having an interactive program guide, (d) the type of communication link between the home and the Central Office (e.g., fixed bandwidth link versus Internet), (e) the basic cost and complexity associated with using each sensor (e.g., more expensive and/or difficult to use sensors are less desirable then less expensive and/or easy to use sensors), and (f) presence of viewing time and/or viewing place shifting devices at a home such as personal video recorders (PVRs), a Media Center PC, etc.

For instance, in a large market having two affiliates of the American Broadcasting Company (ABC™), signatures may not be as effective as codes in identifying the tuned station because of the potential for programming overlap. Accordingly, in such circumstances, the weighting selector 54 may select a preference ranking such as that shown in FIG. 4A wherein the audio code sensor 12 is preferred to the video code sensor 14, the video code sensor 14 is preferred to the audio signature sensor 16, the audio signature sensor 16 is preferred to the video signature sensor 18, and the video signature sensor 18 is preferred to the software meter sensor 20.

In another example, a particular market may be better served by signatures than codes because, for example, two or more broadcasting stations in the market refuse to insert codes in their broadcast(s) or have a poor history of following through with such code insertion. In such a circumstance, the weighting selector 54 may select a preference ranking such as that shown in FIG. 4B wherein the audio signature sensor 16 is preferred to the video signature sensor 18, the video signature sensor 18 is preferred to the audio code sensor 12, and the audio code sensor 12 is preferred to the video code sensor 14.

Households may also have certain fixed characteristics that dictate a preference order for the sensors 12-20. For example, a household with a set top box having an interactive program guide may be better monitored by the data from the software meter than any of the other data collecting engines. In such a circumstance, the weighting selector 54 may select a preference ranking such as that shown in FIG. 4C wherein the software meter sensor 20 is preferred to the audio code sensor 12, the audio code sensor 12 is preferred to the audio signature sensor 16, the audio signature sensor 16 is preferred to the video code sensor 14, and the video code sensor 14 is preferred to the video signature sensor 18. As an example, a household with a PVRs may be more easily measured by using audio codes than by using signatures.

Persons of ordinary skill in the art will readily appreciate that the weighting selector 54 may be automated to automatically select the order preference for the sensors 12-20 in response to receipt of input data indicating the fixed system variables for the household of interest. Alternatively, the weighting selector 54 may be implemented by a matrix of rules such as those shown in FIGS. 4A-4C wherein an installer of the apparatus 50 may select a rule from the matrix with little or no automated assistance. Alternately, the sensor selector 52 may be provided with a predetermined order preference and/or fixed system factors may be ignored altogether at the time of installation and/or at the time of manufacture of the apparatus 50.

Once a preference order of the sensors 12-20 is determined, the sensor selector 52 identifies which of the sensor(s) 12-20 should be employed to collect data. In particular, the example sensor selector 52 determines which of the sensor(s) 12-20 to ignore and/or which of the sensor(s) 12-20 to utilize to gather data by measuring one or more variable system factors and comparing certain characteristics of the available sensor(s) to the variable factor(s) currently present in the system. Variable system factors may include, for example: (a) a presence of an audio code, (b) a presence of a video code, (c) available bandwidth of a communication link between the apparatus 50 located at a home site and a remote site such as the central office 24, (d) available storage capacity at the local site (e.g., storage available on the home side of the communication channel 26), (e) available storage capacity at the remote site (e.g., storage available on the central office side of the communication channel 26), (f) processing speed associated with a processor at the local site (e.g., the statistically sampled home monitored by the apparatus 50), (g) processing speed associated with a processor at the remote site (e.g., the central office 24), (h) audible noise at the local site, and (i) a condition of a set top box (e.g., powered on).

For the purpose of identifying sensor(s) 12-20 which are presently capable of gathering audience measurement data, the sensor selector 52 is further provided with a sensor tester 56. The sensor tester 56 determines which of the sensors 12-20 are presently outputting valid data by, for example, comparing the output of the sensors 12-20 against an expected output. For instance, if the audio sensor 12 does not output an audio code within a predetermined time (e.g., because the program being viewed does not have audio codes or the audio code sensor 12 is defective), the audio code sensor 12 is identified as invalid by the sensor tester 56, although this invalid state may not be permanent as explained below.

The sensor tester 56 performs similar examinations of the outputs of the other available sensors 14-20. Any sensor 12-20 that is producing an expected output is identified as a valid sensor, whereas any sensor 12-20 that does not produce an expected output within a predetermined time period is assumed defective (although this assumption may be periodically tested as discussed below).

Once the sensor tester 56 has established the subset of the sensor(s) 12-20 which are currently producing valid data (which may be all or less than all of the sensors 12-20), an output measuring unit 58 develops a measure of the amount of data that may currently be gathered by the valid sensor(s) 12-20 per unit of time. In particular, the output measuring unit 58 sums the amount of data per unit of time that the valid sensor(s) 12-20 are producing. For example, if three of the sensor(s) 12-20 are currently valid, one of the valid sensors is producing 20 kilobytes (KB) of data per second, a second one of the valid sensors is producing 12 KB of data per second and the last valid sensor is outputting 24 KB of data per second, the output measuring unit 58 determines that the valid sensors are currently outputting 56 KB/sec of data (i.e., 20 KB/sec+ 12 KB/sec+24 KB/sec). The result calculated by the output measuring unit 58 is used to determine whether the apparatus 50 can process all of the data available from the currently valid sensor(s) given current system conditions, or if the output of one or more of the valid sensor(s) should be ignored.

For the purpose of determining if the apparatus 50 and/or the central office 24 is capable of processing the volume of data available from the valid sensor(s), the sensor selector 52 is further provided with a processing speed tester 60. As will be appreciated by persons of ordinary skill in the art, both the processor at the home site and the processor at the central office 24 is characterized by a processing speed. The processing speed as used herein is a rate at which a processor may process the data currently being gathered by the valid sensor (s) 12-20. The processing speed is dependent upon several factors including, for example, the physical structure and capabilities of the processor in question (e.g., a 1.7 GigaHertz processor), the software being executed by the processor in question, the amount of tasks being concurrently performed by the processor (e.g., whether multitasking is supported and/or occurring), and the type of data processing the processor is asked to perform (e.g., parallel processing, serial processing, signature matching, code identification, packetizing data for transmission, encrypting, decrypting, etc.). Thus, the processing speed of a given processor varies over time as a function of the type and quantity of tasks facing that processor. The type and quantity of tasks facing the processor in question are, in turn, a function of the types and quantities of the sensor(s) 12-20 utilized to collect data.

In the illustrated example, the processing speed tester 60 determines if a local processor (e.g., a processor at the home site) is currently capable of operating at sufficient speed to process the data output by the valid sensor(s) 12-20. It may also determine if a remote processor (e.g., a processor at the central office 24) is currently capable of operating at sufficient speed to process the data output by the valid sensor(s) 12-20. The switch 22 is responsive to the processing speed tester 60 to drop, isolate, or otherwise ignore the output of at least one of the valid sensor(s) 12-20 if either the local processor or the remote processor is presently incapable of operating at sufficient speed to process the data from all of the valid sensor(s) (i.e., including the dropped sensor(s)).

In order to determine the amount of data that can currently be transmitted over the communication channel 26, the sensor selector 52 is further provided with a bandwidth sensor 62. The bandwidth sensor 62 develops an estimate of the current bandwidth available on the communications link 26. Persons of ordinary skill in the art will readily appreciate that a bandwidth estimation can be made in any of a number of ways. For example, the bandwidth sensor 62 may make an estimation of the currently available bandwidth by using the current time of day to access a look-up table storing historical statistical data identifying the historically expected bandwidth of the communication channel as a function of time of day. Alternatively, the bandwidth sensor 62 may gather real time data by monitoring the rate at which data is currently being transferred between the home site and the central office 24.

Irrespective of the manner in which the bandwidth sensor 62 estimates the currently available bandwidth, a storage monitor 64 of the sensor selector 52 utilizes the estimated bandwidth to determine if one or more storage devices have sufficient capacity to store at least a subset of the data output by the valid sensor(s) 12-20. In particular, if the estimated bandwidth of the communication channel is smaller than the data output by the valid sensor(s) under consideration, the storage monitor 64 determines if a local storage device associated with the home site has sufficient capacity to buffer the data output by the valid sensor(s) 12-20 under consideration for a length of time sufficient for a store and forward model to function properly. For instance, the storage monitor 64 may use the estimated bandwidth determined by the bandwidth sensor 62 to calculate an expected rate of growth of data added to the buffer because it cannot be transmitted under the current conditions. If the determined rate of growth indicates that the local storage device will be out of storage space in less than a predetermined length of time (e.g., one half hour), the storage monitor 64 may determine that the local storage device does not have sufficient storage capacity under current conditions to store all the data requiring storage if all of the valid sensor(s) 12-20 under consideration are employed. Accordingly, the switch 22 responds to this determination by isolating at least one of the valid sensor(s) 12-20. Again, this state of isolation may not be permanent. Rather, the apparatus 10 will adapt to conditions such that, if appropriate, the isolated sensor will be brought back out of isolation.

The central office 24 includes one or more processors which receive and process data from a multiple number of home sites/apparatus 50. The central office 24 stores the data it processes in one or more storage devices. Because the central office 24 receives data from a number of home sites, the illustrated sensor selector 52 is structured to determine whether the storage capacity of the central office 24 allocated to the home site monitored by the apparatus 50 in question is sufficient to store the data being collected by the valid sensor (s) 12-20. To this end, the sensor selector 52 communicates with the central office 24 to determine the amount of available storage capacity allocated to the home unit in question. For example, the amount of available storage capacity allocated to the subject home unit may be equal to the total storage capacity available at the central office 24 divided by the number of home units being monitored.

Once the sensor selector 52 is provided with an indication of the amount of available storage capacity allocated to the subject home unit, the storage monitor 64 uses the expected rate of data collection associated with the valid sensor(s) 12-20 to determine if the allocated storage capacity will be depleted too quickly if the valid sensor(s) under consideration are employed. For example, if the rate of data collection indicates that the remote storage capacity allocated to the subject home unit will be exhausted in less than a predetermined length of time (e.g., one half hour), the storage monitor 64 may determine that the central office's storage device does not have sufficient storage capacity under current conditions to store all the data requiring storage if all of the valid sensor (s) 12-20 under consideration are employed. The switch 22 responds to this determination by isolating at least one of the valid sensor(s) 12-20.

Figure 5A:
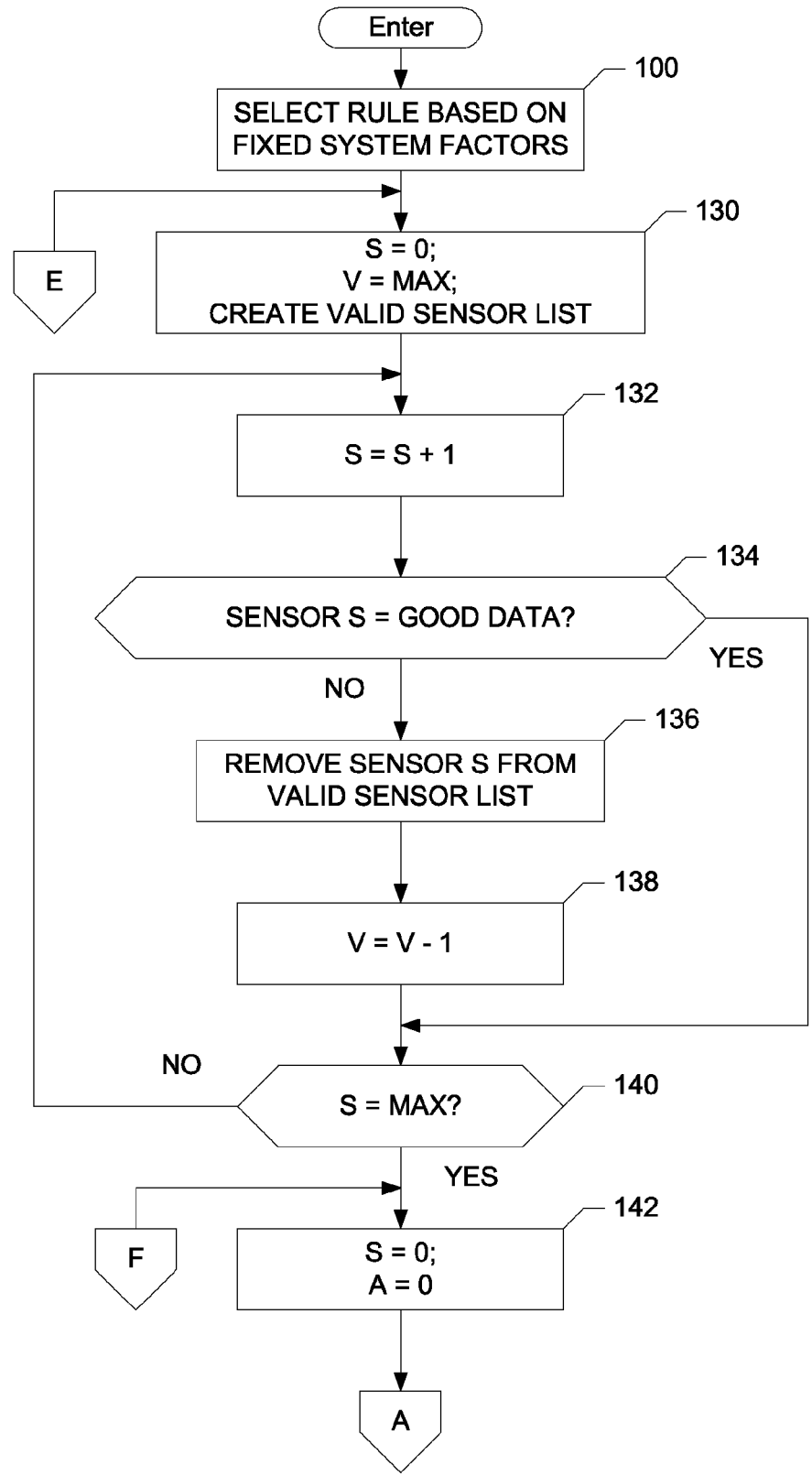
FIGS. 5A-5D are a flowchart illustrating an example program for implementing the apparatus of FIG. 2.
Figure 5B:
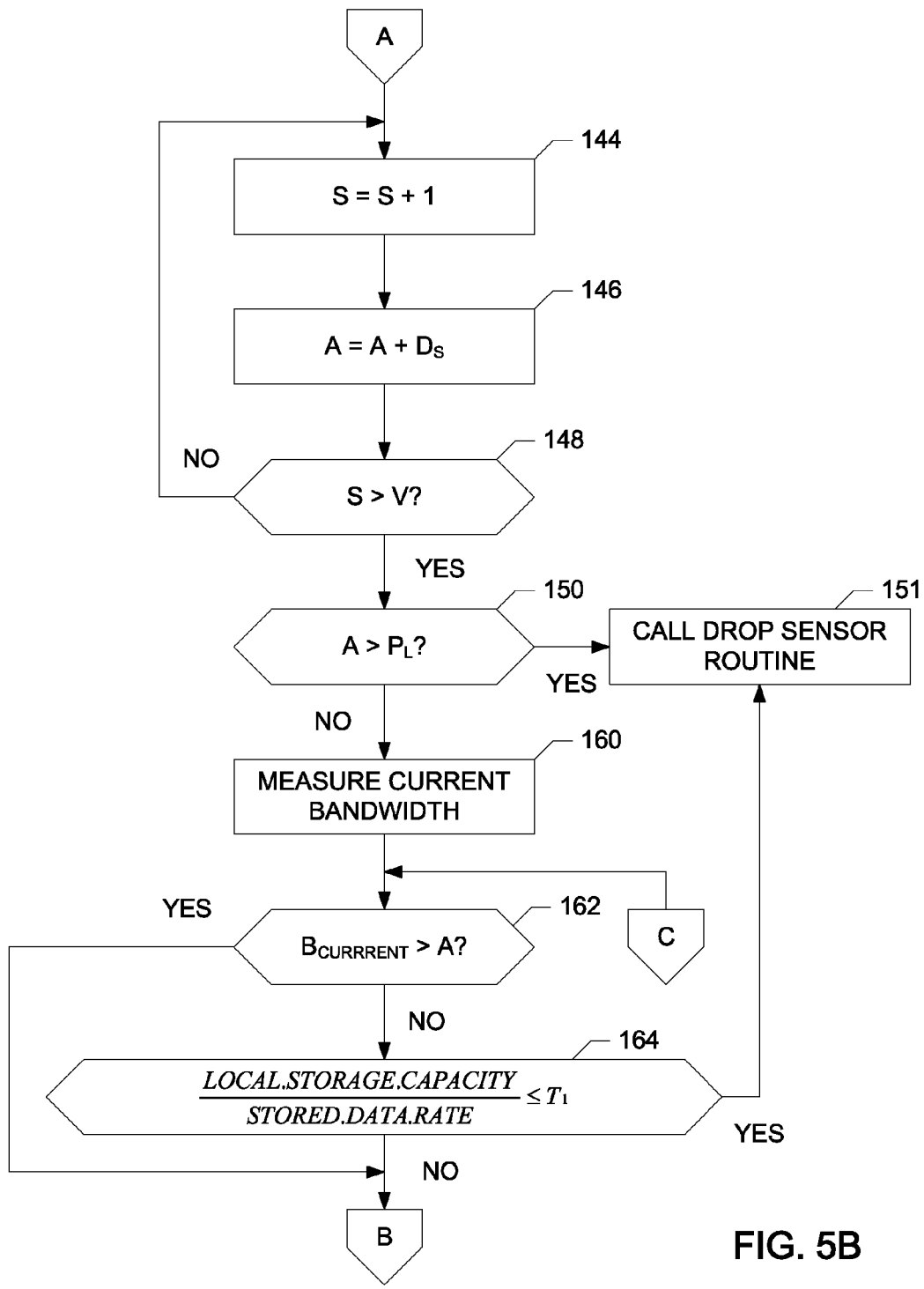
Figure 5C:
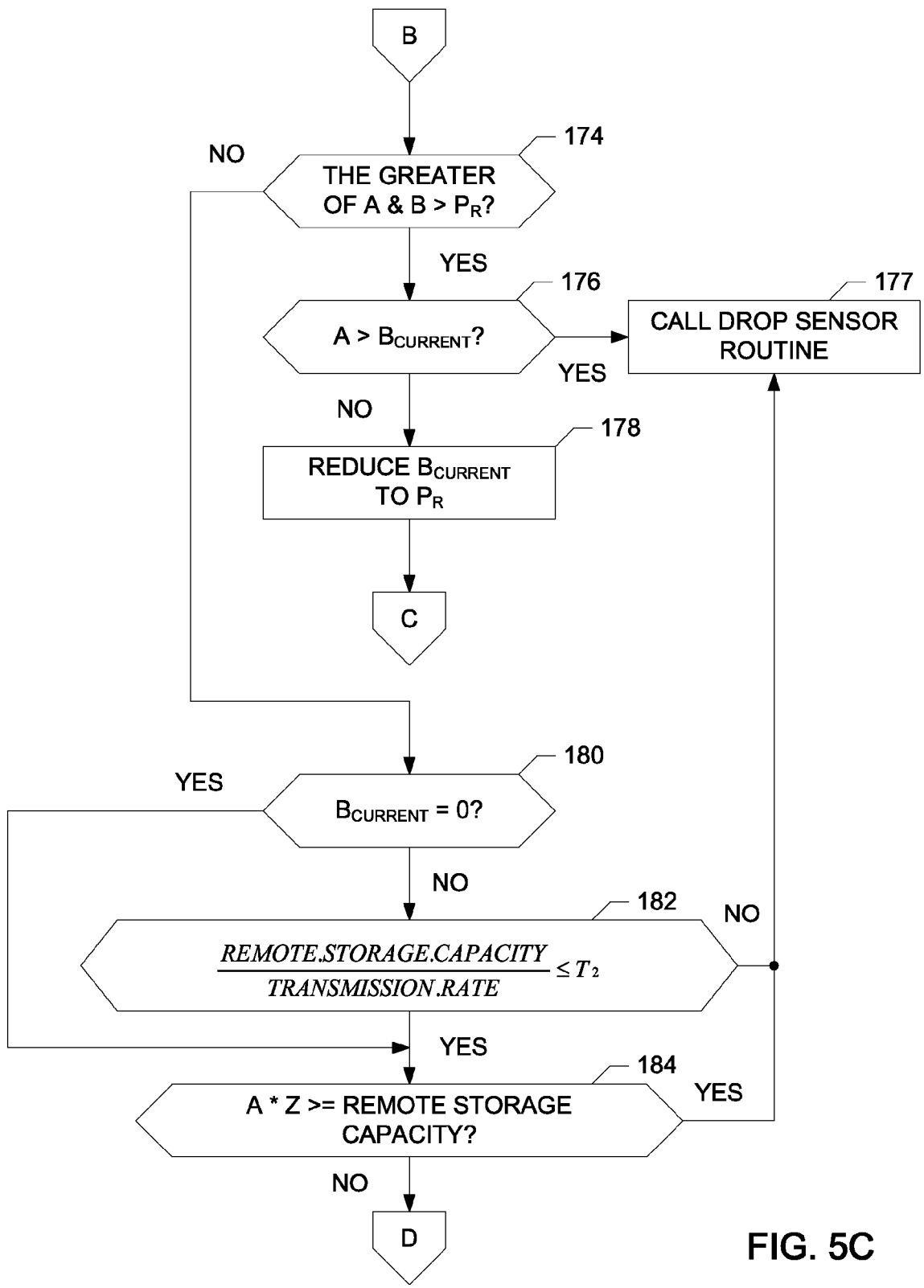
Figure 5D:
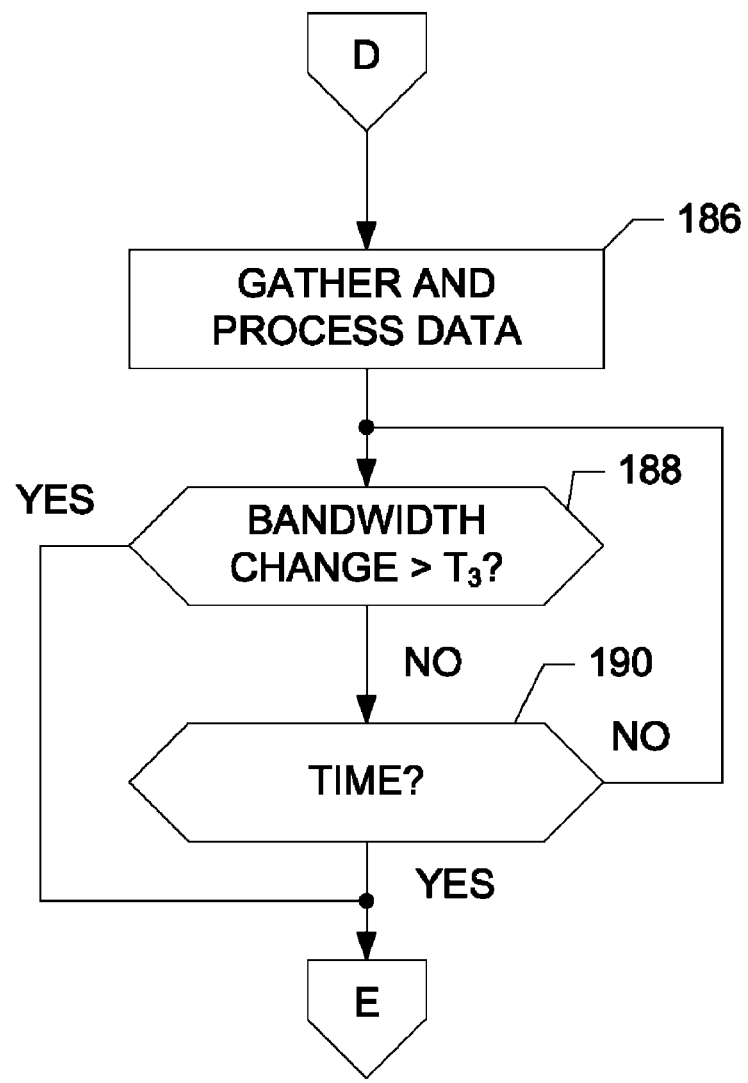
Figure 6:
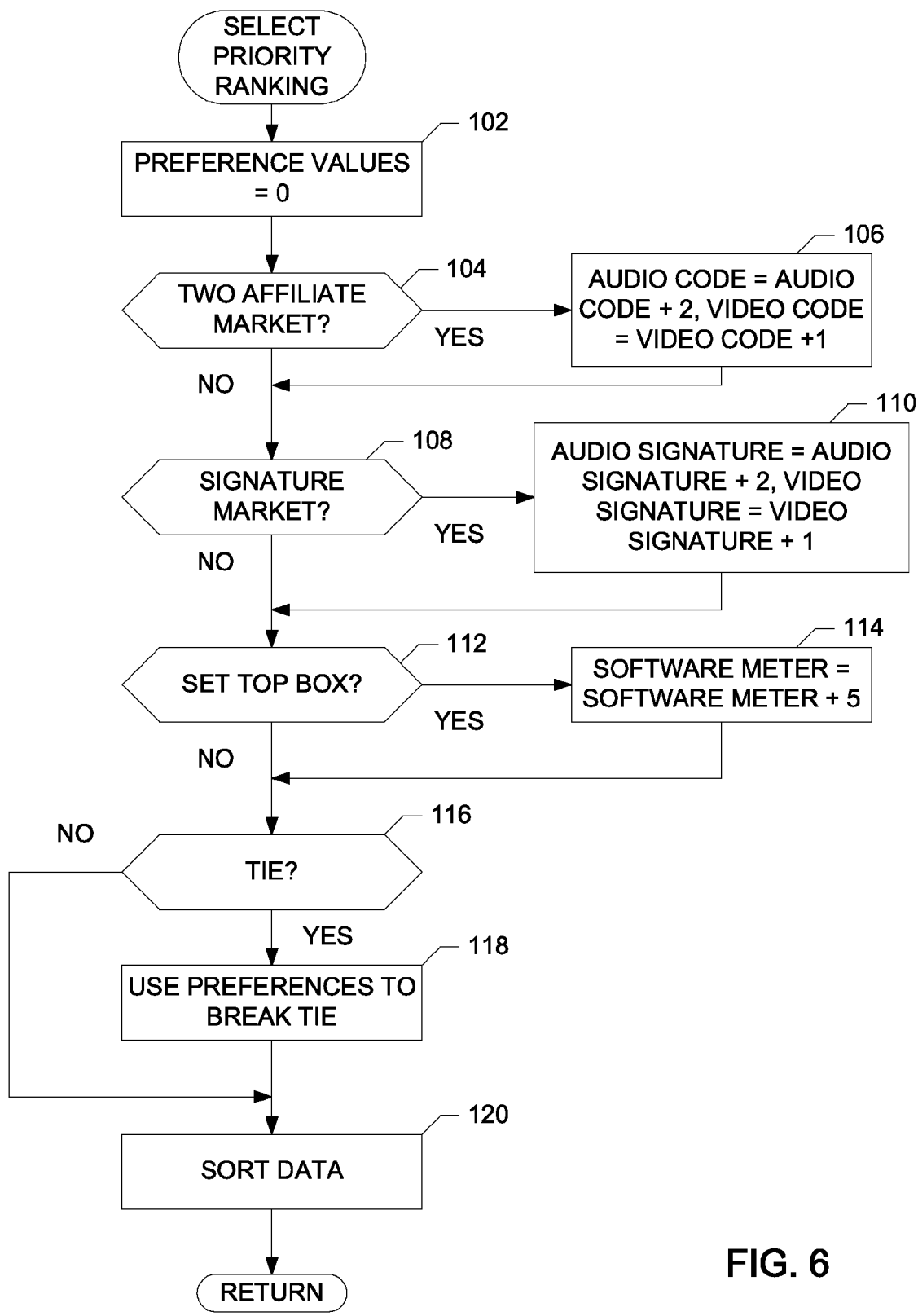
FIG. 6 is a flowchart illustrating an example routine for assigning a priority ranking to the sensors based on one or more fixed system factors.
Figure 8:
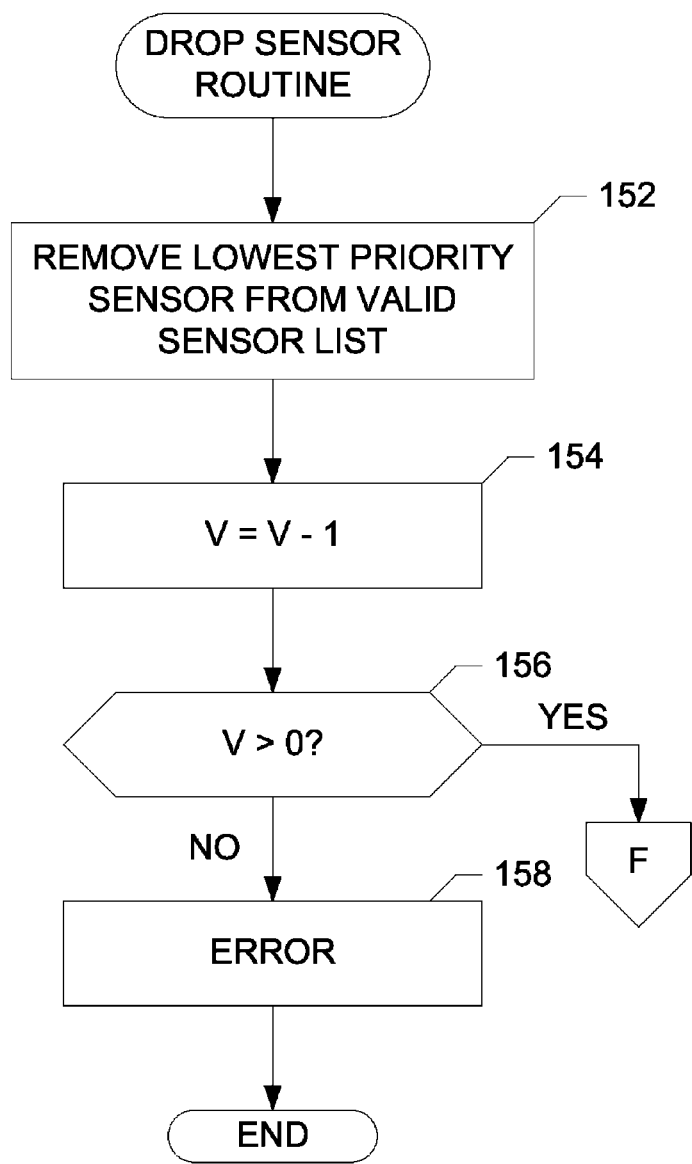
FIG. 8 illustrates an example DROP SENSOR routine which may be called by the program of FIGS. 5A-5D.

A flowchart representative of example machine readable instructions for implementing the sensor selector 52 of FIG. 3 is shown in FIGS. 5, 6 and 8. In this example, the machine readable instructions comprise a program for execution by a processor such as the processor 1012 shown in the example computer 1000 discussed below in connection with FIG. 9. The program may be embodied in software stored on a tangible medium such as a CD-ROM, a floppy disk, a hard drive, a digital versatile disk (DVD), or a memory associated with the processor 1012, but persons of ordinary skill in the art will readily appreciate that the entire program and/or parts thereof could alternatively be executed by a device other than the processor 1012 and/or embodied in firmware or dedicated hardware in a well known manner. For example, any or all of the weighting selector 54, the sensor tester 56, the output measuring unit 58, the processing speed tester 60, the bandwidth sensor 62 and/or the storage monitor 64 could be implemented by software, hardware, and/or firmware. Further, although the example program is described with reference to the flowcharts illustrated in FIGS. 5, 6 and 8, persons of ordinary skill in the art will readily appreciate that many other methods of implementing the example sensor selector 52 may alternatively be used. For example, the order of execution of the blocks may be changed, and/or some of the blocks described may be changed, eliminated, or combined.

The program of FIG. 5 begins at block 100 where a priority or preference ranking of the sensor(s) 12-20 is selected based on the fixed system factors. As stated above, the selection of the priority ranking may be performed manually (e.g., by selecting a rule from a set of rules such as rule 1, 2 or 3 of FIGS. 4A-4C from a menu) or automatically. In the illustrated sensor selector 52, the priority ranking is automatically determined by the weighting selector 54. Thus, at block 100, the SELECT PRIORITY RANKING routine is called.

As shown in FIG. 6, the SELECT PRIORITY RANKING routine begins at block 102 where the weighting selector 54 sets preference values associated with the sensors 12-20 equal to zero. The weighting selector 54 then determines whether the market in which the home site monitored by the apparatus 50 is located is a two affiliate market (e.g., if two affiliates of a broadcasting company are broadcasting in the subject market) (block 104). This determination may be made automatically by employing one or more of the sensors 12-20 and the tuner of the information presenting device (e.g., a television or radio) to identify the stations broadcasting in the relevant market. Alternatively, the determination of whether two affiliates of the same broadcasting company are servicing the relevant market may be made by requesting the installer to input data indicative of the same. If the weighting selector 54 determines that the relevant market is a two affiliate market (block 104), control advances to block 106. Otherwise, control advances to block 108.

Assuming for purposes of discussion that two affiliates are servicing the relevant market (block 104), the weighting selector 54 increments the audio code preference value by two and the video code preference value by one because codes are preferred to signatures in the two affiliates in one market context and because audio codes are preferred to video codes (block 106). Control then proceeds to block 108.

At block 108, the weighting selector 54 determines if the market in question is a signature preferred market, for example, because codes are not being used by some broadcasting stations servicing the market. This determination can be made automatically by employing one or more of the sensors 12-20 and the tuner of the information presenting device (e.g., a television or radio) to determine if any of the stations broadcasting in the relevant market are refusing to use codes. Alternatively, the determination of whether any broadcasting companies servicing the relevant market are refusing to use codes may be made by requesting the installer to input data indicative of the same. If the weighting selector 54 determines that the relevant market is a signature preferred market (block 108), control advances to block 110. Otherwise, control advances to block 112.

Assuming for purposes of discussion that the relevant market is a signature preferred market (block 108), the weighting selector 54 increments the audio signature preference value by two and the video signature preference value by one because signatures are preferred to codes in this context and because audio signatures are preferred to video signatures (block 110). Control then proceeds to block 112.

At block 112, the weighting selector 54 determines if the information presenting device being monitored includes a set top box with an interactive program guide. If so, control advances to block 114. Otherwise, control advances to block 116.

Assuming for purposes of discussion that a set top box with an interactive program guide is present (block 112), the weighting selector 54 increments the software meter preference value by five because the software meter sensor 20 is preferred in this context (block 114). Control then advances to block 116.

Persons of ordinary skill in the art will appreciate that the weighting selector 54 may consider fixed system factors other than, or in addition to, those described above in connection with blocks 104-114 to develop the preference rankings for the sensors 12-20. Thus, additional blocks may be inserted between block 112 and block 116 in FIG. 6 and/or some or all of blocks 104-114 may be replaced with blocks directed to other fixed factors.

After the weighting detector 54 has completed the fixed system factor analysis (block 112 or block 114), the weighting selector 54 determines if any of the preference values are equal (block 116). If any of the preference values are equal (block 116), the weighting selector 54 adjusts the values to remove the equality in accordance with a predetermined preference order (block 118). For example, audio sensors may be preferred to video sensors, codes may be preferred to signatures, and software metering may be preferred to codes. Using this or another rule of thumb, the weighting selector 54 adjusts the tied preference values to ensure that no ties exist. In so doing, the weighting selector 54 ensures that no tied preference value is advanced above a non-tied preference value to preserve the preference ranking(s) dictated by the fixed factors.

After any ties are resolved (blocks 116 and 118), control advances to block 120. At block 120, the weighting selector 54 sorts the preference values to arrive at a preference ranking rule. The preference ranking rule is used in selecting which sensors 12-20 to isolate, should the variable system factors indicate that isolation is required. In particular, when it is necessary to isolate a valid sensor, the valid sensor with the lowest preference rating is isolated. If another valid sensor must be isolated, the valid sensor with the next lowest preference rating is isolated and so on. Persons of ordinary skill in the art will appreciate that any known sorting algorithm such as, for example, a bubble sort algorithm may be employed to sort the preference values.

After the preference ranking of the sensors 12-20 is selected (block 100, FIG. 5A), the sensor tester 56 sets a sensor counter S to zero and a valid sensor counter V to zero (block 130). The sensor tester 56 also creates a valid sensor list such as the list shown in FIG. 7A (block 130). The valid sensor list is a list of all sensors 12-20 connected to the switch 22. The sensors 12-20 are listed in the valid sensor list in accordance with the preference ranking set by the weighting selector 54. For example, the sensor with the highest preference value may appear as the first sensor in the valid sensor list and the sensor with the lowest sensor value may appear as the last sensor in the valid sensor list.

After the valid sensor list is created, the sensor tester 56 enters a loop wherein it determines which of the sensors 12-20 are outputting valid data. In particular, the sensor tester 56 increments the sensor counter S by one (block 132) and then determines if the sensor pointed to by the sensor counter S is outputting good data (block 134). As discussed above, the sensor tester 56 may determine whether a sensor 12-20 is outputting valid data by comparing the output of the sensor to an expected output stored in memory.

If the sensor pointed to by the sensor counter S is outputting valid data (block 134), control advances to block 140 without adjusting the data in the valid sensor list. If, on the other hand, the sensor S is not outputting valid data (block 134), the sensor tester 56 removes that sensor from the valid sensor list (block 136). For example, if the sensor pointed to by the counter S is the video signature sensor 18, and the video signature sensor 18 is not outputting valid data, the video signature sensor 18 is removed from the valid sensor list as shown in FIG. 7B. The valid sensor counter V is then decremented by one (block 138) and control advances to block 140.

At block 140, the sensor tester 56 determines if the counter S has reached a value equal to the number of sensors 12-20 connected to the switch 22. If the counter S is less than the number of sensors 12-20, all of the sensors 12-20 have not yet been tested by the sensor tester 56. Accordingly, control returns to block 132 where the sensor counter S is incremented to point to the next sensor. Control continues to loop through blocks 132-140 until every sensor 12-20 has been tested by the sensor tester 56 and classified as a valid or invalid sensor. Control then advances to block 142.

At block 142, the output measuring unit 58 resets the sensor counter S to zero and sets an output measurement variable A to zero. The output measuring unit 58 then enters a loop whereby it determines the amount of data per unit of time output by the sensor(s) appearing in the valid sensor list. In particular, the output measuring unit 58 increments the sensor counter S by one (block 144) and then adds the number of bytes per second output by the first sensor on the valid sensor list to the output measurement variable A (block 146). For example, assuming the valid sensor list is the list appearing in FIG. 7B and the sensor counter S equals one, the output measurement unit 58 adds the number of bytes per second $D_S$ that the audio code sensor 12 is outputting to the output measurement variable A (block 146). Control then advances to block 148.

At block 148, the output measurement unit 58 determines if the sensor counter S has exceeded the number of valid sensor(s) appearing on the valid sensor list. If not, then the output measurement unit 58 has not summed the outputs of all of the sensor(s) on the valid sensor list and control, thus, returns to block 144. Control continues to loop through blocks 144-148 until the outputs of all of the sensor(s) appearing on the valid sensor list have been summed Control then advances to block 150.

At block 150, the processing speed tester 60 determines if the local processor associated with the home site is capable of processing the aggregate output A of the sensor(s) appearing on the valid sensor list. In particular, the processing speed tester 60 compares the value in the output measurement variable A to the currently available processing speed $P_L$ of the local processor (block 150). If the sensors on the valid sensor list are outputting more data than the local processor is currently capable of processing (block 150), the processing speed tester 60 calls the DROP SENSOR routine (block 151). As shown in FIG. 8, the DROP SENSOR routine begins when the processing speed tester 60 removes the sensor having the lowest preference value from the valid sensor list (block 152). For example, if the current valid sensor list is the list appearing in FIG. 7B, the processing speed sensor 60 deletes the software meter sensor 20 from the valid sensor list such that the valid sensor list now includes only three sensors as shown in FIG. 7C. The processing speed tester 60 then decrements the valid sensor counter by one (block 154).

If the valid sensor counter has fallen to zero (block 156), then there are no valid sensors appearing on the valid sensor list and control advances to block 158. At block 158 an error message is issued and the process terminates since the apparatus 50 is currently unable to collect and/or process any data.

If the valid sensor counter has not fallen to zero (block 156), control returns to block 142 (FIG. 5A). At block 142, the sensor counter S and the output measurement variable A are reset to zero, and the output measuring unit 58 again sums the outputs of the sensors appearing on the valid sensor list. Because there is one fewer sensor on the valid sensor list this time, the output measurement variable A will have a lower value (i.e., fewer sensor outputs are being considered and, thus, the combined output of those sensors is typically smaller). As a result, the local processor is more likely to be capable of processing the aggregate output of the sensors on the valid sensor list.

Control continues to loop through blocks 142-156 until the number of sensors appearing on the valid sensor list is reduced to a level that the local processor can handle, and/or until no sensors are listed in the valid sensor list.

Assuming that the local processor is capable of handling the output of the sensors currently appearing in the valid sensor list (e.g., the list appearing in FIG. 7C) (block 150), control advances to block 160 (FIG. 5B). At block 160, the bandwidth sensor 62 measures the current bandwidth $B_{current}$ of the communication link 26. If the current bandwidth $B_{current}$ of the communication link 26 is larger than the output A of the sensors appearing on the valid sensor list (block 162), then the communication link 26 is currently capable of forwarding all of the data output by the sensors without delay. Accordingly, there is only a negligible need for local storage, and control advances to block 174.

If, however, the currently available bandwidth $B_{current}$ of the communication link 26 is smaller than the aggregate output A of the sensors appearing on the valid sensor list (block 162), then the storage monitor 64 determines if there is sufficient local storage capacity to handle the output of the sensors appearing on the valid sensor list given the current condition of the communication link 26. In particular, at block 164 the storage monitor 64 divides the local storage capacity by the rate at which data output by the sensors must be stored in the local storage device. If the computed ratio of storage capacity to storage usage rate exceeds a predetermined threshold $T_1$ (block 164), then there is insufficient local storage to process all of the data output by the sensors appearing on the valid sensor list. Accordingly, the storage monitor 64 calls the DROP SENSOR routine (block 151) which, as explained above, removes the sensor having the lowest preference value from the valid sensor list (block 152, FIG. 8). For example, if the current valid sensor list is the list appearing in FIG. 7C, the storage monitor 64 deletes the audio signature sensor 16 from the valid sensor list such that the valid sensor list now includes only two sensors as shown in FIG. 7D. The storage monitor 64 then decrements the valid sensor counter V by one (block 154). If the valid sensor counter V has fallen to zero (block 156), then there are no valid sensors appearing on the valid sensor list and control advances to block 158 where an error message is issued and the process terminates. If the valid sensor counter V has not fallen to zero (block 156), control returns to block 142 where the output measuring unit 58 re-computes the output measurement value A based on the reduced valid sensor list. Control continues to loop through blocks 142-164 until the number of sensors appearing on the valid sensor list is reduced to a level that the local processor and the local storage unit can handle, and/or until no sensors are listed in the valid sensor list Assuming the local storage unit has sufficient capacity to handle the local storage requirements of the sensors appearing on the valid sensor list given the fixed and current variable system factors (block 164), control advances to block 174. At block 174, the processing speed tester 60 determines if the remote processor has sufficient available processing speed to process the data the apparatus 50 currently expects to forward to the central office 24 via the communications link 26. In particular, the processing speed tester 60 determines if the processor at the central office 24 is capable of processing data delivered at the greater of the current measured bandwidth $B_{current}$ and the total output A of the sensors appearing on the valid sensor list (block 174). This determination may be made with status data transmitted from the central office 24 in response to a query from the apparatus 50. For example, the apparatus 50 may request the central office 24 to identify its current processing speed availability (e.g., how much data per unit of time the remote processor may currently accept given the current demands on the remote processor's data handling capabilities).

Assuming for purposes of discussion that the remote processing speed is insufficient to handle the amount of data being delivered via the communication link 26 (block 174), the processing speed tester 60 determines if the current combined output A of the sensors appearing on the valid sensor list is greater than the bandwidth $B_{current}$ currently available on the communication channel 26 (block 176). If the bandwidth $B_{current}$ of the communications channel 26 is greater than the combined output A of the sensors appearing on the valid sensor list (block 176), the speed processing tester 60 reduces the value of the current bandwidth variable $B_{current}$ to equal the current processing speed of the remote processor (block 178). The switch 22 is also notified that it should not transmit data at a rate faster than the reduced bandwidth value $B_{current}$ to ensure that the processor at the remote central office 24 is not overwhelmed with too much data. Control then returns to block 162 so the processing speed tester 60 is provided with the opportunity to ensure that the local storage device has sufficient capacity to handle the output A of the sensors appearing on the valid sensor list at the reduced level of data transmission dictated by the reduced bandwidth value $B_{current}$ (block 164). If the local storage capacity is insufficient to handle the increased buffering rate associated with decreasing the rate of transmission between the home site and the central office 24, the DROP SENSOR routine is called (block 177) and another sensor 12-20 is removed from the valid sensor list as explained above. Of course, if another sensor is dropped from the valid sensor list (FIG. 8, blocks 152-154), control returns to block 142 to reevaluate the variable system factors against the new expected output A of the sensors appearing on the revised valid sensor list as explained above, unless no sensors are identified in that list (FIG. 8, block 156).

If, on the other hand, it is determined at block 176 (FIG. 5C) that the combined output A of the sensors appearing on the valid sensor list already exceeds the current bandwidth $B_{current}$ of the communication link 26 (block 176), then, instead of applying more pressure to the local buffer by reducing the rate of transmission from the home site to the central office 24, the processing speed tester 60 calls the DROP SENSOR routine (block 177) to remove the least preferred sensor from the valid sensor list (FIG. 8, block 152). The valid sensor counter is then decremented (FIG. 8, block 154) and, if there are still sensors appearing on the valid sensor list (block 156), control returns to block 142 (FIG. 5A) to reevaluate the variable system factors against the new expected output A of the sensors appearing on the revised valid sensor list as explained above. As noted above, if there are no sensors listed in the valid sensor list (FIG. 8, block 156), an error message is issued (block 158) and the process terminates.

If the remote processor is capable of handling the data transmitted by the home site over the communication channel 26 (FIG. 5C, block 174), control advances to block 180. At block 180, the storage monitor 64 determines if the current bandwidth value is zero thereby indicating that no data is to be transmitted to the host site until a later time. If so, control advances to block 184. Otherwise, control advances to block 182.

At block 182, the storage monitor 64 determines if the central office 24 has sufficient storage capacity allocated to the subject home unit to receive the data gathered by the sensors listed on the valid sensor list given the expected transmission rate. In particular, at block 182 the storage monitor 64 divides the remote storage capacity the central office 24 has allocated to the home site in question by the rate at which the apparatus 50 currently expects to transmit data to the central site 24 (i.e., the value stored in the current available bandwidth variable $B_{current}$ which may be the actual available bandwidth or a reduced value (see FIG. 5C, block 178)). If the computed ratio of remote storage capacity to transmission rate exceeds a predetermined threshold $T_2$ (block 182), then there is insufficient remote storage to receive all of the data output by the sensors appearing on the valid data list. Accordingly, the storage monitor 64 calls the DROP SENSOR routine (block 177) to remove the sensor having the lowest preference value from the valid sensor list as explained above. Control then returns to block 142 (FIG. 5A) where the output measuring unit 58 re-computes the output measurement value A based on the reduced valid sensor list. Control continues to loop through blocks 142-182 until the number of sensors appearing on the valid sensor list is reduced to a level that the local processor and the local storage unit can handle, and/or until no sensors are listed in the valid sensor list.

Assuming the remote processor is capable of receiving the data transmitted from the home site (block 182), control advances to block 184. At block 184, the storage monitor 64 determines if the amount of data A gathered by the sensors on the valid sensor list will exhaust the capacity of the remote storage device in too short of a time. In particular, the storage monitor 64 queries the remote processor for a value indicative of the amount of remote storage capacity currently allocated to the home site in question. When the central office 24 responds with this data, the storage monitor 64 multiplies the combined output A of the sensors appearing on the valid sensor list by a constant time factor (e.g., two hours) and determines if the result of that calculation is greater than the remote storage capacity (block 184). If so, then the remote storage capacity will be exhausted too quickly at the current data collection rate A, so the storage monitor calls the DROP SENSOR routine (block 177) to remove the sensor having the lowest preference value from the valid sensor list as explained above. Control then returns from the DROP SENSOR routine to block 142 of FIG. 5A where the output measuring unit 58 re-computes the output measurement value A based on the reduced valid sensor list. Control continues to loop through blocks 142-184 until the number of sensors appearing on the valid sensor list is reduced to a level that the local processor, the local storage unit, the remote processor, and the remote storage unit can handle, and/or until no sensors are listed in the valid sensor list.

Assuming that the remote processor has sufficient storage capacity to handle the current data collection rate (block 184), control advances to block 186 (FIG. 5D). At block 186, the home site processes the data collected by the sensors appearing on the valid sensor list in accordance with conventional data collection and processing routine subject to any reduced transmission rate (see block 178). The home unit will continue to collect and process data using the sensors appearing in the valid sensor list until the bandwidth sensor 62 determines that the currently available bandwidth has changed (i.e., increased or decreased) by an amount greater than a threshold $T_3$ (block 188), or until a predetermined length of time has expired (block 190). When a sufficient change in available bandwidth is detected (block 188) and/or expiration of the predetermined time has occurred (block 190), control returns to block 130 to re-run the entire process to determine an appropriate set of the sensors 12-20 to gather data given the current variable system factors.

Figure 10A:
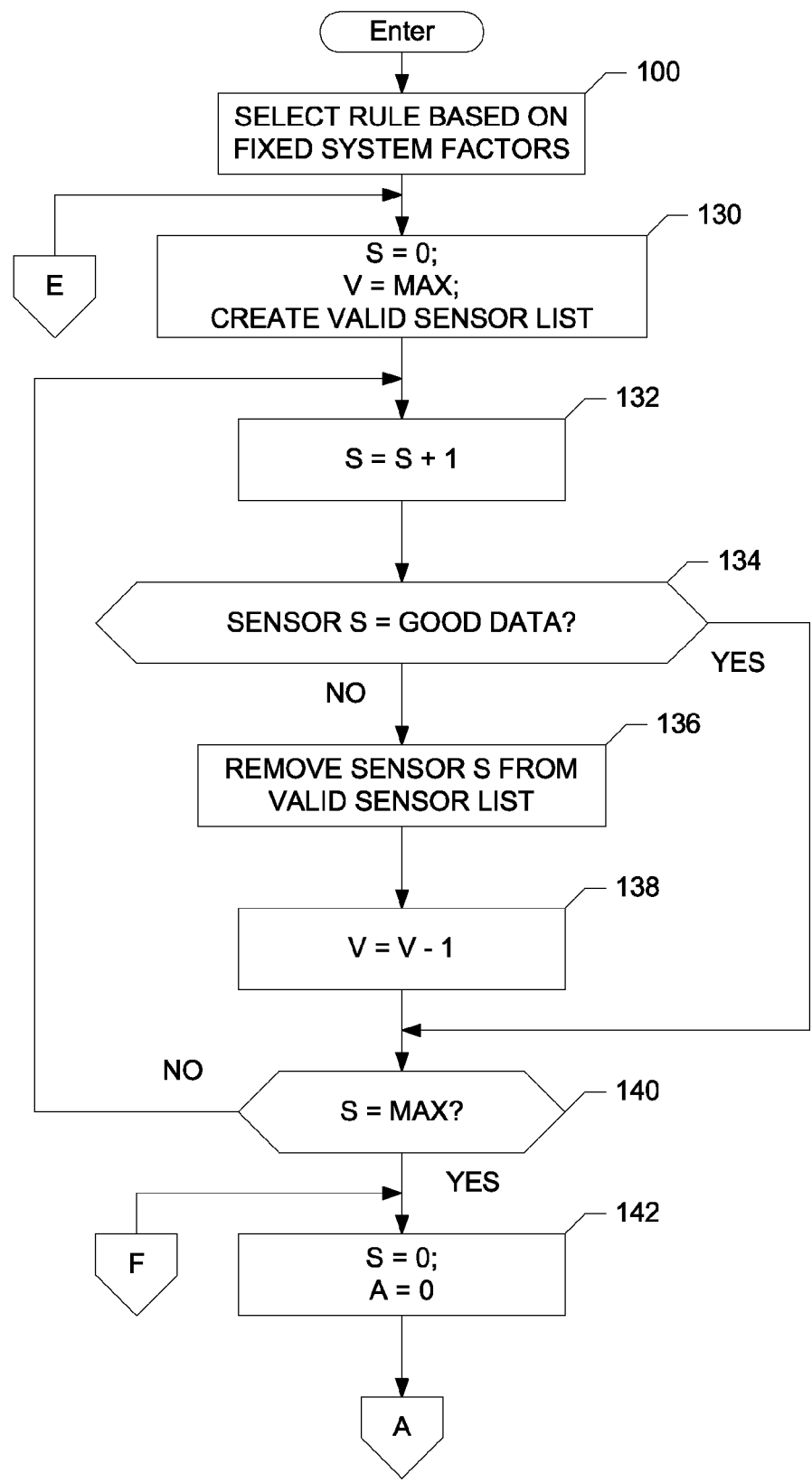
FIGS. 10A-10C are a flowchart illustrating another example program for implementing the apparatus of FIG. 2.
Figure 10B:
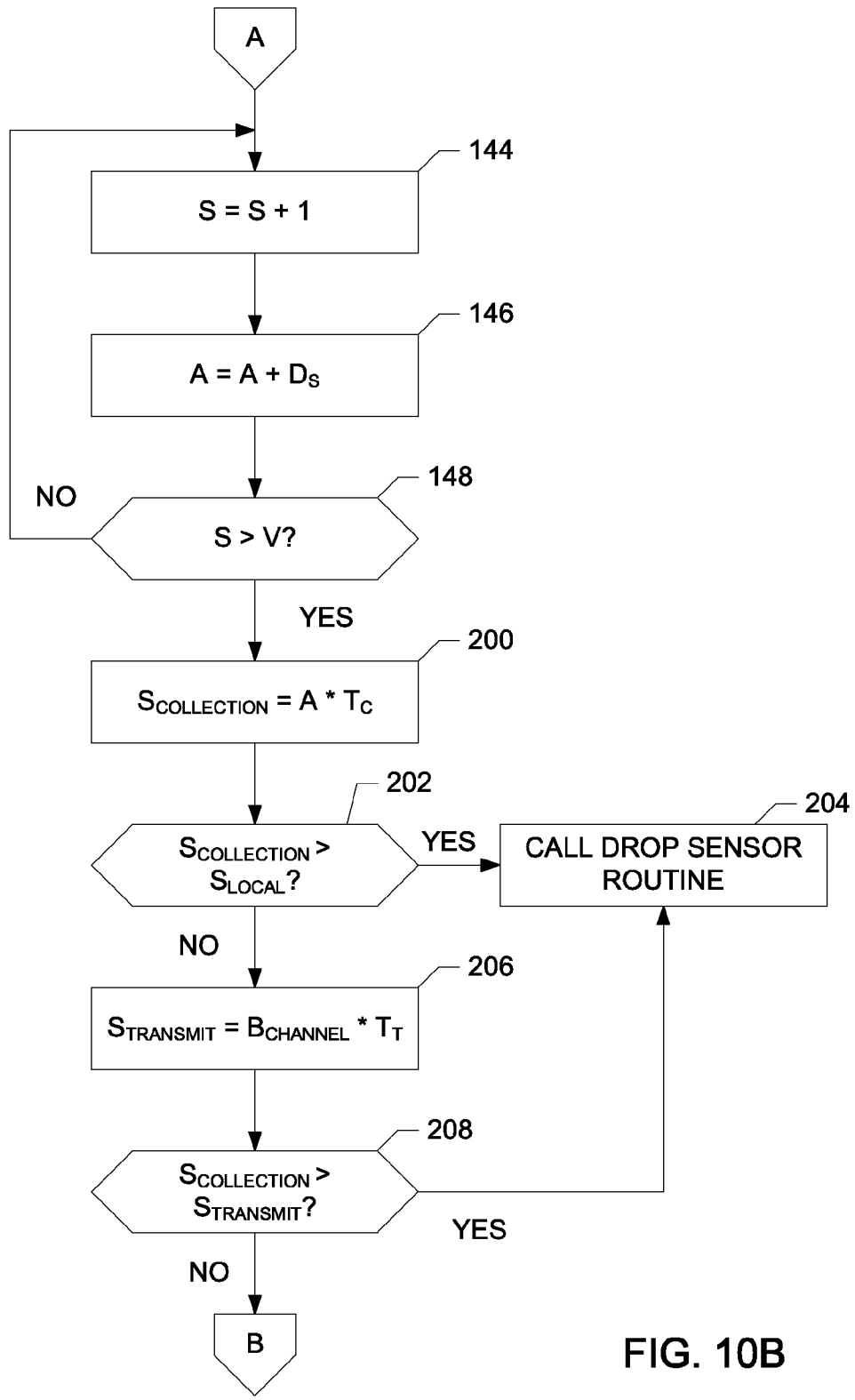
Figure 10C:
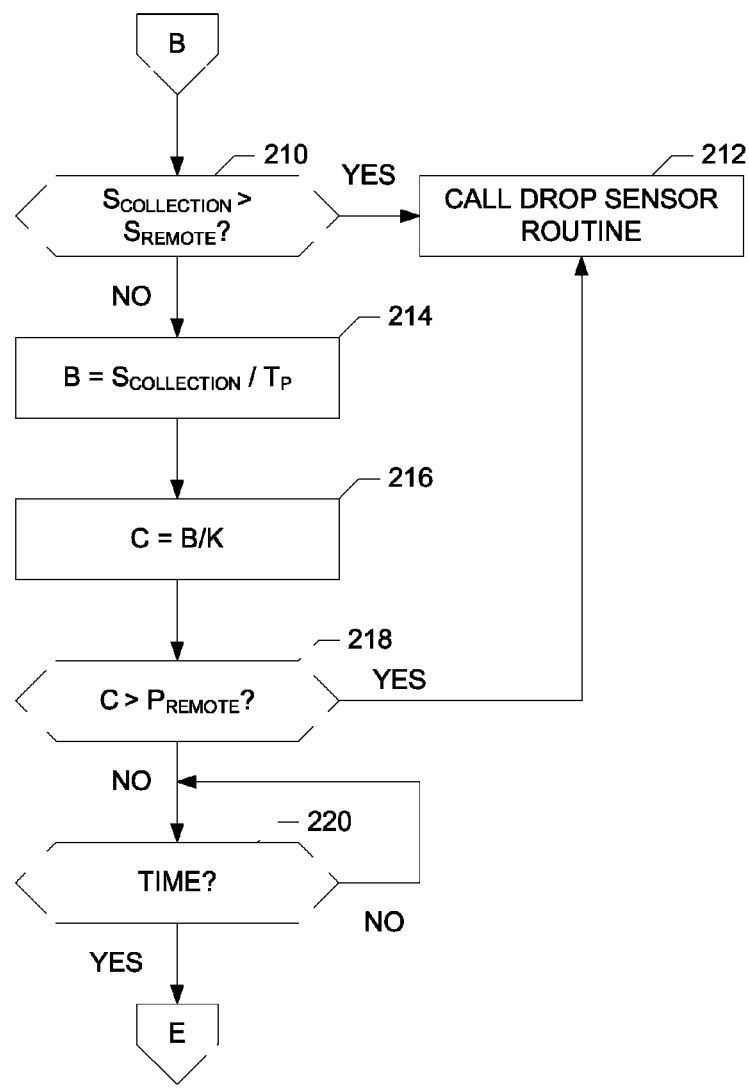

A flowchart representative of another example set of machine readable instructions for implementing the sensor selector 52 of FIG. 3 is shown in FIGS. 10A-10C. In this example, the machine readable instructions comprise a program for execution by a processor such as the processor 1012 shown in the example computer 1000 discussed below in connection with FIG. 13. The program may be embodied in software stored on a tangible medium such as a CD-ROM, a floppy disk, a hard drive, a digital versatile disk (DVD), or a memory associated with the processor 1012, but persons of ordinary skill in the art will readily appreciate that the entire program and/or parts thereof could alternatively be executed by a device other than the processor 1012 and/or embodied in firmware or dedicated hardware in a well known manner. For example, any or all of the weighting selector 54, the sensor tester 56, the output measuring unit 58, the processing speed tester 60, the bandwidth sensor 62 and/or the storage monitor 64 could be implemented by software, hardware, and/or firmware. Further, although the example program is described with reference to the flowcharts illustrated in FIGS. 10A-10C and 8, persons of ordinary skill in the art will readily appreciate that many other methods of implementing the example sensor selector 52 may alternatively be used. For example, the order of execution of the blocks may be changed, and/or some of the blocks described may be changed, eliminated, or combined.

Figure 9:
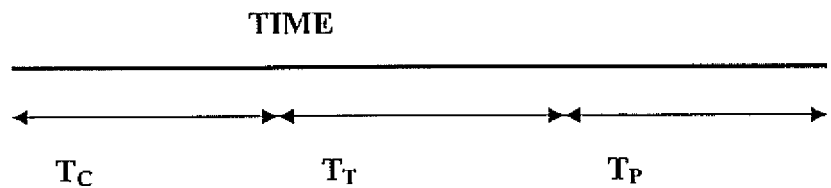
FIG. 9 is a graphical representation of time periods in an example store and forward paradigm for implementing the apparatus of FIG. 2.

The example of FIGS. 10A-10C represents a store and forward approach to implementing the apparatus of FIG. 3 wherein data is collected in a first time period, data is transmitted in a second time period, and data is processed in a third time period. As shown in FIG. 9, a predetermined maximum period of time Tc (e.g., between 1:00 PM and 3:00 AM) is selected for the home unit to collect data. Data may or may not be collected during this entire time period, depending on usage of the viewing device. In the example of FIG. 9, a maximum length of time $T_T$ is selected for transmitting the collected data to the central office 24. This maximum length of time $T_T$ may be chosen, for example, as a time period occurring after the conclusion of the collecting time period Tc, such that the data collection period Tc and the transmission period $T_T$ do not overlap as shown in FIG. 9. Additionally, a maximum length of time $T_P$ for processing the data at the central office 24 to produce ratings data is selected. In the example of FIG. 9, this maximum time period $T_P$ is selected such that it does not overlap with either of the data collection period TC or the transmission period $T_T$.

The example program of FIGS. 10A-10C begins like the example program of FIGS. 5A-5D. In fact, in the illustrated example, blocks 100-148 of FIGS. 10A-10B are identical to blocks 100-148 of FIGS. 5A-5B. In the interest of brevity, the description of blocks 100-148 will not be repeated here. Instead, the interested reader is referred to the above passages discussing those blocks in the context of FIGS. 5A-5B.

After the aggregate output data rate (A, measured in Bytes/sec) produced by the valid, non-isolated, sensors has been calculated (block 148), control advances to block 200. At block 200, the output measuring unit 58 calculates the aggregate maximum number of bytes ($S_{COLLECTION}$) which may possibly be produced by the valid sensors during the data collection period ($T_C$) by multiplying the aggregate output data rate (A) with the data collection period ($T_C$ measured in seconds).

The storage monitor 64 then determines if the maximum number of bytes ($S_{COLLECTION}$) which may possibly be produced by the valid, non-isolated, sensors during the data collection period ($T_C$) is greater than the capacity of the local storage device ($S_{LOCAL}$) associated with the home unit (block 202). If $S_{COLLECTION}$ is greater than $S_{LOCAL}$, then the possible amount of data which may be collected is too much for the local storage device to store. Accordingly, the DROP SENSOR routine is called (block 204) and executed as explained above in connection with FIG. 8. Otherwise, the local storage device has sufficient storage capacity to handle the total possible amount of data that may be collected (block 202), and control advances to block 206.

At block 206, the maximum number of bytes ($S_{TRANSMIT}$) that may be transmitted during the maximum possible uptime ($T_T$) of the communication channel 26 is calculated. In particular, the bandwidth sensor 62 calculates the maximum possible number of transmitted bytes ($S_{TRANSMIT}$) by multiplying the maximum possible bandwidth of the channel ($B_{CHANNEL}$), with the maximum length of the transmission period ($T_T$) (block 206). The bandwidth sensor 62 then compares the maximum number of bytes ($S_{COLLECTION}$) which may be collected during the collection period ($T_c$) to the maximum number of bytes ($S_{TRANSMIT}$) that may be transmitted during the transmission period ($T_T$) (block 208). If the maximum number of bytes that may be collected ($S_{COLLECTION}$) is greater than the maximum number of bytes that may be transmitted ($S_{TRANSMIT}$) (block 208), then the DROP SENSOR routine is called (block 204) and executed as explained in connection with FIG. 8. Otherwise, control advances to block 210 (FIG. 10C).

At block 210, the storage monitor 64 compares the maximum number of collected bytes ($S_{COLLECTION}$) to the maximum storage availability ($S_{REMOTE}$) of the remote storage device. If the maximum number of collected bytes ($S_{COLLECTION}$) exceeds the maximum storage capacity ($S_{REMOTE}$) of the storage device at the central office 24 (block 210), then the DROP SENSOR routine is called (block 212) and executed as explained in connection with FIG. 8. Otherwise, control advances to block 214.

At block 214, the processing speed tester 60 calculates the maximum required processing byte rate (B) for the remote processor associated with the central office 24 to process the collected data ($S_{COLLECTION}$) within the allotted processing time ($T_P$). In particular, the processing speed tester 60 calculates the maximum required processing byte rate (B) by dividing the maximum number of collected bytes ($S_{COLLECTION}$) by the maximum length of the processing time period ($T_P$) (block 214). The maximum required byte rate (B) is then converted to a maximum required cycle rate (C) by dividing the maximum required byte rate (B) by a constant (K) which is indicative of the maximum operating speed of the remote processor measured in cycles per second (block 216).

Once the maximum required cycle rate (C) is calculated (block 216), it is compared to the maximum processing speed ($P_{REMOTE}$) of the remote processor (block 218). If the maximum required cycle rate (C) is greater than the maximum processing speed ($P_{REMOTE}$) (block 218), then the DROP SENSOR routine is called (block 212) and executed as explained in connection with FIG. 8. Otherwise, control advances to block 220.

Control remains at block 220, until a time-out occurs. When the time-out occurs, control returns to block 130 of FIG. 10A to re-start the process.

Figure 12A:
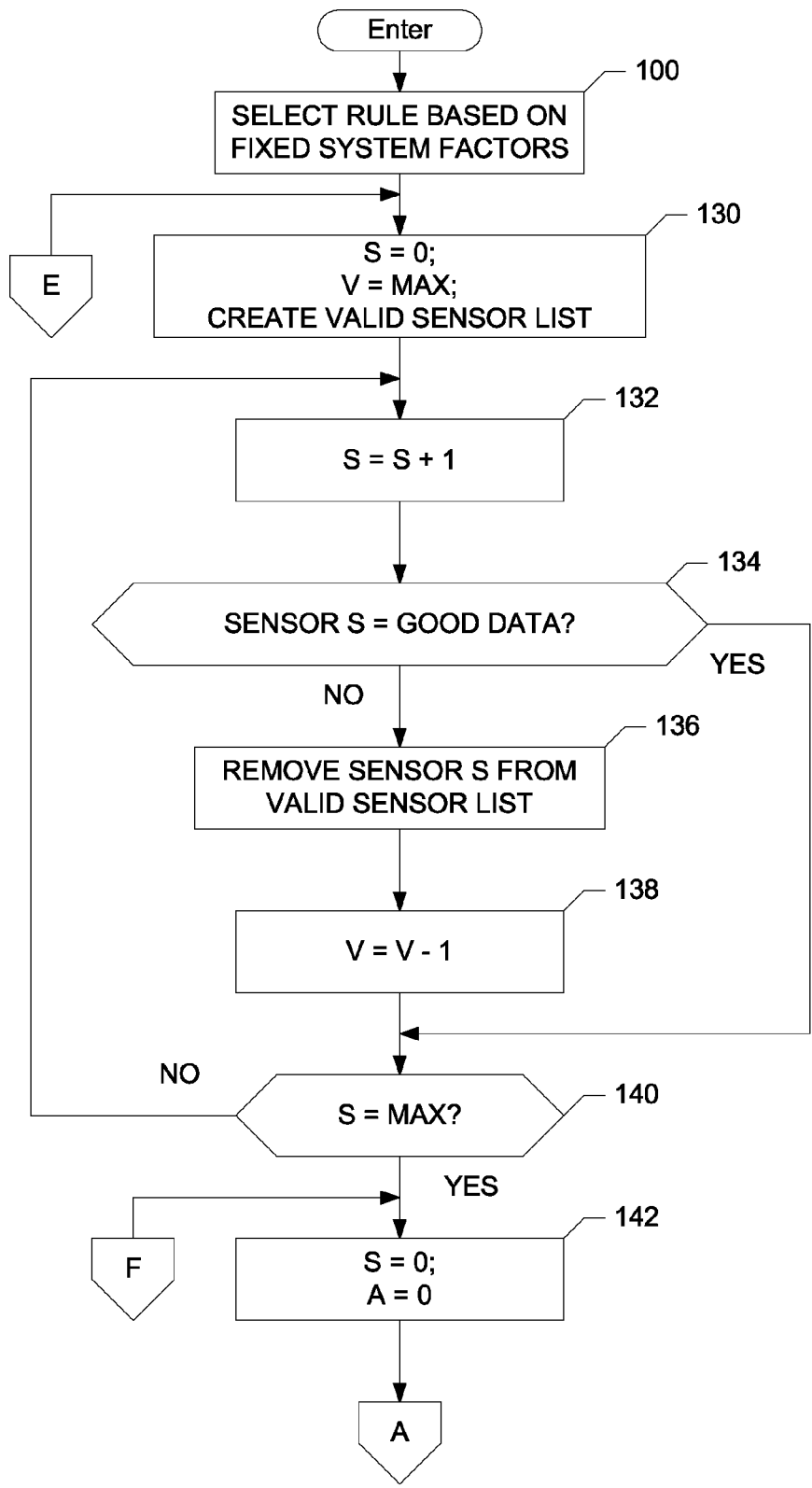
FIGS. 12A-12C are a flowchart illustrating another example program for implementing the apparatus of FIG. 2.
Figure 12B:
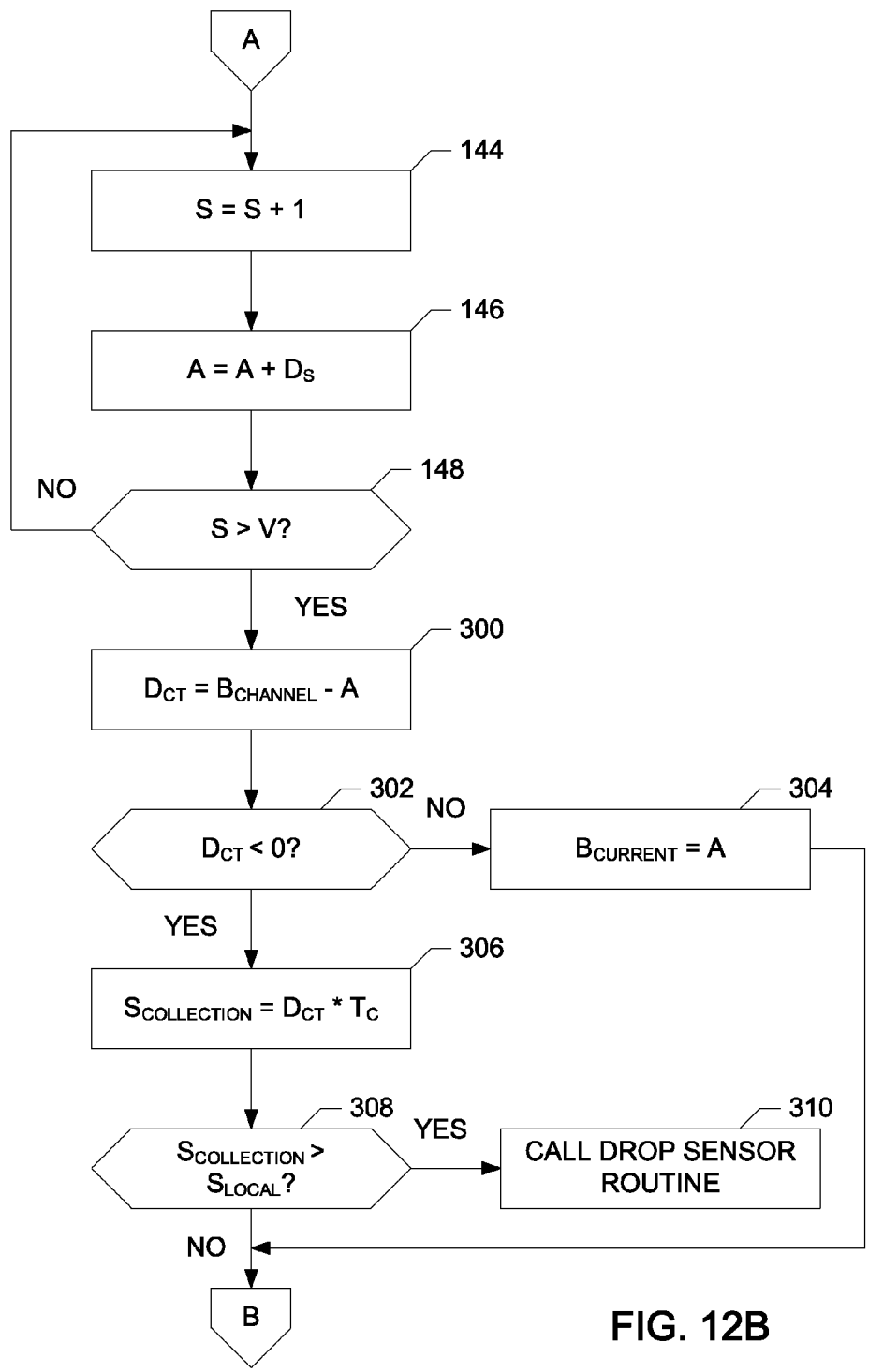
Figure 12C:
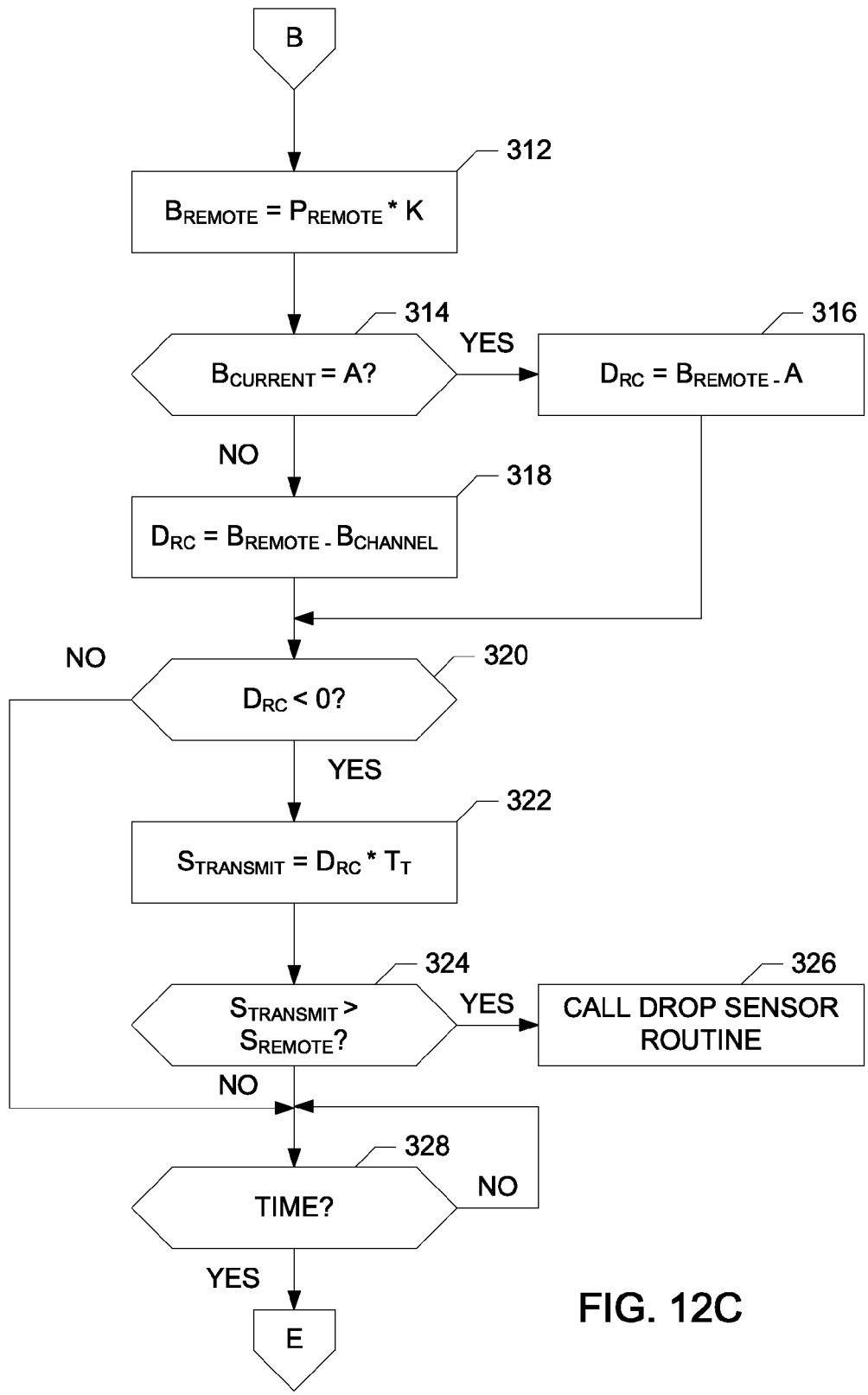

A flowchart representative of another example set of machine readable instructions for implementing the sensor selector 52 of FIG. 3 is shown in FIGS. 12A-12C. In this example, the machine readable instructions comprise a program for execution by a processor such as the processor 1012 shown in the example computer 1000 discussed below in connection with FIG. 13. The program may be embodied in software stored on a tangible medium such as a CD-ROM, a floppy disk, a hard drive, a digital versatile disk (DVD), or a memory associated with the processor 1012, but persons of ordinary skill in the art will readily appreciate that the entire program and/or parts thereof could alternatively be executed by a device other than the processor 1012 and/or embodied in firmware or dedicated hardware in a well known manner. For example, any or all of the weighting selector 54, the sensor tester 56, the output measuring unit 58, the processing speed tester 60, the bandwidth sensor 62 and/or the storage monitor 64 could be implemented by software, hardware, and/or firmware. Further, although the example program is described with reference to the flowcharts illustrated in FIGS. 12A-12C and 8, persons of ordinary skill in the art will readily appreciate that many other methods of implementing the example sensor selector 52 may alternatively be used. For example, the order of execution of the blocks may be changed, and/or some of the blocks described may be changed, eliminated, or combined.

Figure 11:
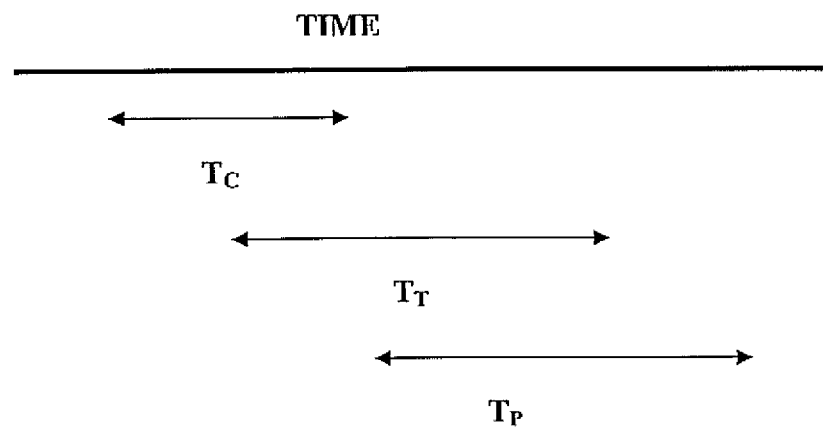
FIG. 11 is a graphical representation of time periods in an example store and forward paradigm for implementing the apparatus of FIG. 2.

The example of FIGS. 12A-12C represents a real time or near real time approach to implementing the apparatus of FIG. 3 wherein data is collected in a first time period, data is transmitted in a second time period which at least partially overlaps the first period, and data is processed in a third time period which at least partially overlaps the second time period. In this way, ratings data can be developed in real time or near real time. As shown in FIG. 11, a predetermined maximum period of time Tc (e.g., between 1:00 PM and 3:00 AM) is selected for the home unit to collect data. Data may or may not be collected during this entire time period, depending on usage of the viewing device. In the example of FIG. 11, a maximum length of time $T_T$ is selected for transmitting the collected data to the central office 24. This maximum length of time $T_T$ may be chosen, for example, as a time period occurring at least partially during the collecting time period Tc, such that the data collection period Tc and the transmission period $T_T$ at least partially overlap as shown in FIG. 11. Additionally, a maximum length of time $T_P$ for processing the data at the central office 24 to produce ratings data is selected. In the example of FIG. 11, this maximum time period $T_P$ is selected such that it at least partially overlaps with the transmission period $T_T$.

The example program of FIGS. 12A-12C begins like the example program of FIGS. 5A-5D. In fact, in the illustrated example, blocks 100-148 of FIGS. 12A-12B are identical to blocks 100-148 of FIGS. 5A-5B. In the interest of brevity, the description of blocks 100-148 will not be repeated here. Instead, the interested reader is referred to the above passages discussing those blocks in the context of FIGS. 5A-5B.

After the aggregate output data rate (A, measured in Bytes/sec) produced by the valid, non-isolated, sensors has been calculated (block 148), control advances to block 300. At block 300, the bandwidth sensor 62 calculates any mismatch ($D_{CT}$) between the maximum available bandwidth ($B_{CHANNEL}$) of the channel 26 and the amount of data (A) currently being collected by the valid, non-isolated sensors. In particular, the bandwidth sensor 62 calculates any difference ($D_{CT}$) by subtracting the aggregate output data rate (A) from the maximum available bandwidth ($B_{CHANNEL}$) (block 300).

If the difference ($D_{CT}$) between the aggregate output data rate (A) and the maximum available bandwidth ($B_{CHANNEL}$) is less than zero (block 302), then the data collection rate is faster than the maximum transmission capacity. Accordingly, it will be necessary to buffer some of the collected data and/or drop one or more valid sensors. Therefore, control advances to block 306 where the storage monitor 64 calculates the amount of local storage capacity required to buffer the necessary amount of collected data. In particular, the storage monitor 64 calculates the maximum amount of data that will need to be buffered locally ($S_{COLLECTION}$) by multiplying the difference ($D_{CT}$) between the aggregate output data rate (A) and the maximum available bandwidth ($B_{CHANNEL}$) with the maximum length of the collection period ($T_C$) (block 306). It then compares the maximum amount of data that will need to be buffered locally ($S_{COLLECTION}$) to the capacity of the local storage device ($S_{LOCAL}$) (block 308). If the required amount of storage ($S_{COLLECTION}$) exceeds the local storage capacity ($S_{LOCAL}$) (block 308), control advances to block 310 where the DROP SENSOR routine is called and executed as explained in connection with FIG. 8. Otherwise, control advances to block 312 (FIG. 12C).

Returning to block 302, if the difference ($D_{CT}$) between the aggregate output data rate (A) and the maximum available bandwidth ($B_{CHANNEL}$) is less than zero, then the data collection rate is slower than the maximum transmission capacity. Accordingly, control advances to block 304 where a variable ($B_{CURRENT}$) indicative of the current bandwidth of the communication channel 26 is set to equal the current output (A) of the valid, non-isolated sensors. Control then advances to block 312 of FIG. 12C.

Irrespective of whether control arrives at block 312 from block 304 or block 308, at block 312 the processing speed tester 60 calculates the processing speed ($B_{REMOTE}$) of the remote processor in bytes per second. In particular, the processing speed tester 60 multiplies the speed of the remote processor ($P_{REMOTE}$) measured in cycles per second with the processor constant (K) to develop a measure of the remote processor's speed in bytes per second (block 312). Control then advances to block 314.

If the variable $B_{CURRENT}$ is set to equal the current collection rate (A) (block 314), the available bandwidth fo the communication channel 26 exceeds the quantity of data (A) being collected by the non-isolated, valid sensors and control advances to block 316. Otherwise, control advances to block 318.

At block 316, the processing speed tester 60 calculates the difference ($D_{RC}$) between the processing speed ($B_{REMOTE}$) of the remote processor and the current collection rate (A) of the non-isolated, valid sensors to determine if the remote processor will be able to handle the maximum amount of data to be transmitted through the channel 26. Control then advances to block 320.

At block 318, on the other hand, the processing speed tester 60 calculates the difference ($D_{RC}$) between the processing speed ($B_{REMOTE}$) of the remote processor and the maximum available bandwidth ($B_{CHANNEL}$) of the communication channel to determine if the remote processor will be able to handle the maximum amount of data to be transmitted through the channel 26. Control then advances to block 320.

Irrespective of whether control arrives at block 320 from block 316 or block 318, at block 320 the processing speed tester 60 determines if the difference ($D_{RC}$) calculated at one of blocks 316 and 318 is less than zero. If the calculated difference ($D_{RC}$) is less than zero (block 320), then the maximum data transmission rate is faster than the maximum processing speed of the remote processor. Accordingly, it will be necessary to buffer the unprocessed portion of the transmitted data and/or drop one or more valid sensors. Therefore, control advances to block 322 where the storage monitor 64 calculates the amount of remote storage capacity required to buffer the necessary amount of transmitted data. In particular, the storage monitor 64 calculates the maximum amount of data that will require buffering at the remote site ($S_{TRANSMIT}$) by multiplying the difference ($D_{RC}$) calculated at one of blocks 316 and 318 with the maximum length of the transmission period ($T_T$) (block 322). It then compares the maximum amount of data that will requires buffering ($S_{TRANSMIT}$) to the capacity of the remote storage device ($S_{REMOTE}$) (block 324). If the maximum amount of required storage ($S_{TRANSMIT}$) exceeds the remote storage capacity ($S_{REMOTE}$) (block 324), control advances to block 326 where the DROP SENSOR routine is called and executed as explained in connection with FIG. 8. Otherwise, control advances to block 328.

Returning to block 320, if the difference ($D_{RC}$) calculated at one of blocks 316 and 318 is greater than zero, then the maximum data transmission rate is slower than the maximum processing speed of the remote processor. Accordingly, significant remote storage capacity is not required and control advances to block 328.

Control remains at block 328, until a time-out occurs. When the time-out occurs, control returns to block 130 of FIG. 12A to re-start the process.

Figure 13:
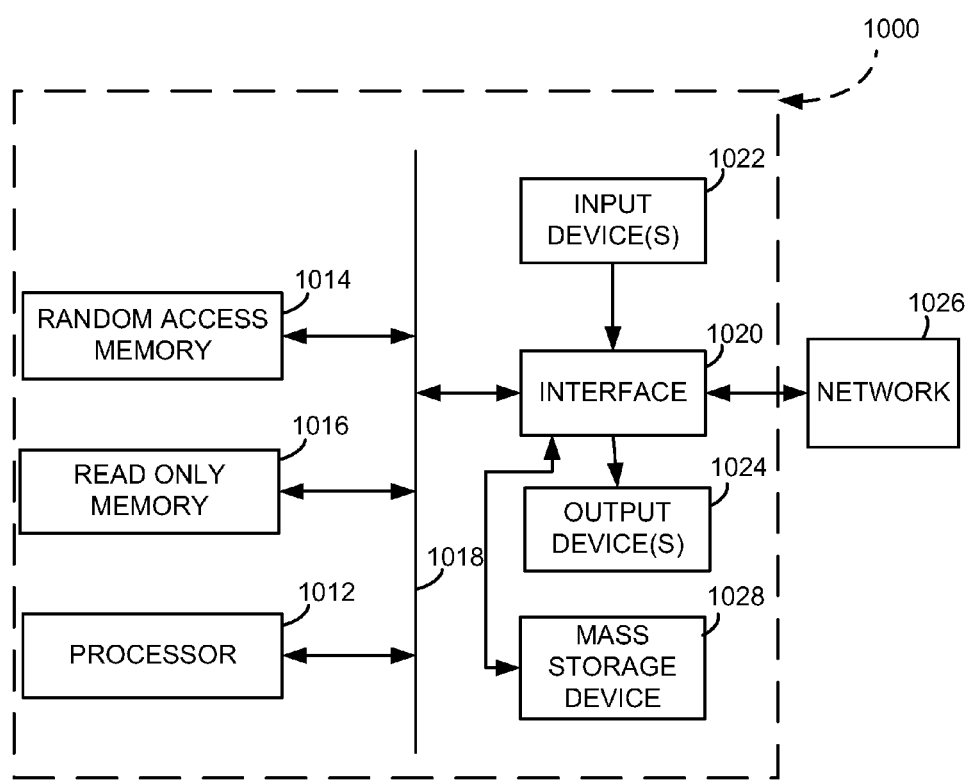
FIG. 13 is a schematic illustration of an example computer which can execute the program of FIGS. 5, 6 and 8 to implement the apparatus of FIG. 2.

FIG. 13 is a block diagram of an example computer 1000 capable of implementing the apparatus 50 and methods disclosed herein. The computer 1000 can be, for example, a dedicated audience measurement device, a server, a personal computer, a personal digital assistant (PDA), an Internet appliance, a DVD player, a CD player, a digital video recorder, a personal video recorder, a set top box, or any other type of computing device.

The system 1000 of the instant example includes a processor 1012. For example, the processor 1012 can be implemented by one or more Intel® microprocessors from the Pentium® family, the Itanium® family or the XScale® family. Of course, other processors from other families are also appropriate.

The processor 1012 is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is typically controlled by a memory controller (not shown) in a conventional manner.

The computer 1000 also includes a conventional interface circuit 1020. The interface circuit 1020 may be implemented by any type of well known interface standard, such as an Ethernet interface, a universal serial bus (USB), and/or a third generation input/output (3GIO) interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, isopoint and/or a voice recognition system.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a communication device (e.g., communication device 56) such as a modem or network interface card to facilitate exchange of data with external computers via a network 1026 (e.g., an Ethernet connection, a digital subscriber line (DSL), a telephone line, coaxial cable, a cellular telephone system, etc.).

The computer 1000 also includes one or more mass storage devices 1028 for storing software and data. Examples of such mass storage devices 1028 include floppy disk drives, hard drive disks, compact disk drives and digital versatile disk (DVD) drives. The mass storage device 1028 may implement the local storage device 62.

From the foregoing, persons of ordinary skill in the art will appreciate that the above disclosed methods and apparatus adapt to present system conditions to gather the amount of audience measurement data that can presently be processed. In particular, data is collected from one or more sensors and/or discarded in response to changes in one or more variable system factors. When conditions permit, data is collected from a larger number of the sensors. In less favorable conditions, data is collected from fewer sensors.

Although certain example methods and apparatus have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A tangible computer-readable medium storing machine readable instructions which, when executed by a machine, cause the machine to implement:

a processor associated with a memory to store audience measurement data at a remote collection site, the processor to facilitate collection and storage of audience measurement data from one or more monitored sites, each site including a plurality of sensors located at the monitored site to gather audience measurement data from the monitored site, the processor to communicate with a switch coupled to the plurality of sensors at each monitored site to dynamically connect the sensors to the memory; and a sensor selector to select which of the sensors the switch connects to the memory, the sensor selector to select which of the sensors the switch connects to the memory based on a comparison involving (a) an amount of audience measurement data per unit of time that is currently capable of being collectively gathered by the plurality of sensors and (b) at least one variable system factor monitored at the remote collection site, wherein the sensor selector is to route data collected from one or more of the sensors to the remote collection site based on the comparison, wherein the sensor selector is to route data collected from one or more of the sensors to the remote collection site.

2. The computer-readable medium of claim 1, further comprising a weighting selector to determine an order of sensors based on at least one fixed system factor.

3. The computer-readable medium of claim 1, wherein the sensor selector includes a sensor testor to determine which of the plurality of sensors at a monitored site is outputting valid data.

4. The computer-readable medium of claim 1, wherein the sensor selector is to be positioned at each of the one or more monitored sites to provide a sensor selection locally at each of the one or more monitored sites.

5. The computer-readable medium of claim 1, wherein the remote collection facility comprises a central facility controlling gathering of audience measurement data from sensors at the plurality of monitored sites via the sensor selector.

6. A method for storing audience measurement data at a remote collection site, the method comprising:

facilitating collection and storage of audience measurement data from one or more monitored sites, each site including a plurality of sensors located at the monitored site to gather audience measurement data from the monitored site;

communicating, using a processor, with a switch coupled to the plurality of sensors at each monitored site to dynamically connect the sensors to the remote collection site for storage;

selecting, using a processor, which of the sensors the switch connects to the remote collection site for storage, the selecting of which of the sensors the switch connects to the memory based on a comparison involving (a) an amount of audience measurement data per unit of time that is currently capable of being collectively gathered by the plurality of sensors and (b) at least one variable system factor monitored at the remote collection site; and routing data collected from one or more of the sensors to the remote collection site for storage based on the selecting of the one or more sensors.

7. The method of claim 6, wherein the selecting further comprises selecting, via a sensor selector positioned at each of the one or more monitored sites, to provide a sensor selection locally at each of the one or more monitored sites.

8. The method of claim 6, wherein the remote collection facility comprises a central facility controlling gathering of audience measurement data from sensors at the plurality of monitored sites via the sensor selector.

9. The method of claim 6, further comprising at least one of ignoring or discarding data from a sensor in the plurality of sensors at the one or more monitored sites that is not selected for storage at the remote collection facility.

10. An apparatus to gather audience measurement data comprising:

a processor associated with a memory to store audience measurement data at a remote collection site, the processor to facilitate collection and storage of audience measurement data from one or more monitored sites, each site including a plurality of sensors located at the monitored site to gather audience measurement data from the monitored site, the processor to communicate with a switch coupled to the plurality of sensors at each monitored site to selectively connect the sensors to the memory; and a sensor selector to select which of the sensors the switch connects to the memory, wherein the sensor selector is to route data collected from one or more of the sensors to the remote collection site, wherein the sensor selector is to select which of the sensors the switch connects to the memory based on a comparison involving (a) an amount of audience measurement data per unit of time that is currently capable of being collectively gathered by the plurality of sensors and (b) at least one variable system factor monitored at the remote collection site, wherein the sensor selector is to route data collected from one or more of the sensors to the remote collection site based on the comparison.

11. The apparatus of claim 10, wherein the at least one variable system factor comprises at least one of processing speed and storage capacity at the remote collection site.

12. The apparatus of claim 10, wherein the at least one variable system factor comprises at least one of processing speed and storage capacity at a monitored site.

13. An apparatus to gather audience measurement data comprising:

a processor associated with a memory to store audience measurement data at a remote collection site, the processor to facilitate collection and storage of audience measurement data from one or more monitored sites, each site including a plurality of sensors located at the monitored site to gather audience measurement data from the monitored site, the processor to communicate with a switch coupled to the plurality of sensors at each monitored site to selectively connect the sensors to the memory;

a weighting selector to determine an order of sensors based on at least one fixed system factor; and a sensor selector to select which of the sensors the switch connects to the memory, wherein the sensor selector is to route data collected from one or more of the sensors to the remote collection site.

14. The apparatus of claim 13, wherein the fixed system factor comprises at least one of: (a) a presence of two or more affiliates of a broadcasting company in a market, (b) a local preference for a sensor type, (c) a presence of a set top box having an interactive program guide; (d) a type of communication link; (e) a cost of using a sensor type; (f) a complexity of using a sensor type; (g) a presence of a viewing time shifting device; and (h) a presence of a viewing place shifting device.

15. A tangible computer-readable medium storing machine readable instructions which, when executed by a machine, cause the machine to implement:

a processor associated with a memory to store audience measurement data at a remote collection site, the processor to facilitate collection and storage of audience measurement data from one or more monitored sites, each site including a plurality of sensors located at the monitored site to gather audience measurement data from the monitored site, the processor to communicate with a switch coupled to the plurality of sensors at each monitored site to selectively connect the sensors to the memory;

a weighting selector to determine an order of sensors based on at least one fixed system factor; and a sensor selector to select which of the sensors the switch connects to the memory, wherein the sensor selector is to route data collected from one or more of the sensors to the remote collection site.

16. A method for storing audience measurement data at a remote collection site, the method comprising:

facilitating collection and storage of audience measurement data from one or more monitored sites, each site including a plurality of sensors located at the monitored site to gather audience measurement data from the monitored site;

communicating, using a processor, with a switch coupled to the plurality of sensors at each monitored site to selectively connect the sensors to the remote collection site for storage;

selecting, using a processor, which of the sensors the switch connects to the remote collection site for storage;

routing data collected from one or more of the sensors to the remote collection site for storage based on the selecting of the one or more sensors; and at least one of ignoring or discarding data from a sensor in the plurality of sensors at the one or more monitored sites that is not selected for storage at the remote collection facility.

17. An apparatus to gather audience measurement data comprising:

a plurality of monitored sites, each of the monitored sites including a first memory and a plurality of sensors located at the respective monitored site to gather audience measurement data from the respective monitored site, each of the monitored sites including a switch coupled to the plurality of sensors at the respective monitored site to selectively connect the sensors to the first memory, each of the monitored sites including a respective sensor selector to select which of the sensors the switch connects to the first memory; and a remote collection site including a processor associated with a second memory to store aggregated audience measurement data received from the monitored sites, the processor to control collection of the audience measurement data at the plurality of monitored sites, the processor in communication with the sensor selectors to control a type and quantity of the audience measurement data collected at the respective monitored site and provided to the remote collection site.

18. The apparatus of claim 17, wherein the processor is to select which of the sensors each of the switches at each of the monitored sites connects to the respective first memory based on a comparison involving (a) an amount of audience measurement data per unit of time that is currently capable of being collectively gathered by the plurality of sensors at the corresponding monitored site and (b) a variable system factor monitored at the remote collection site.

19. The apparatus of claim 18, wherein the variable system factor comprises at least one of processing speed and storage capacity at the remote collection site.

20. The apparatus of claim 18, wherein the variable system factor comprises at least one of processing speed and storage capacity at one of the monitored sites.

21. The apparatus of claim 18, further comprising a weighting selector to determine an order of sensors based on a fixed system factor.

22. The apparatus of claim 21, wherein the fixed system factor comprises at least one of: (a) a presence of two or more affiliates of a broadcasting company in a market, (b) a local preference for a sensor type, (c) a presence of a set top box having an interactive program guide; (d) a type of communication link; (e) a cost of using a sensor type; (f) a complexity of using a sensor type; (g) a presence of a viewing time shifting device; and (h) a presence of a viewing place shifting device.

23. The apparatus of claim 18, wherein the sensor selectors include a respective sensor testor to determine which of the plurality of sensors at the respective monitored sites are outputting valid data.

24. The apparatus of claim 17, wherein the sensor selectors are positioned at respective ones of the monitored sites to provide a sensor selection locally at each of the monitored sites.

* * * * *